United States Patent
Schelle et al.

(10) Patent No.: US 10,474,610 B1
(45) Date of Patent: Nov. 12, 2019

(54) HARDWARE TRACE AND INTROSPECTION FOR PRODUCTIVITY PLATFORM USING A SYSTEM-ON-CHIP

(71) Applicant: Xilinx, Inc., San Jose, CA (US)

(72) Inventors: Graham F. Schelle, Longmont, CO (US); Patrick Lysaght, Los Gatos, CA (US); Yun Qu, Campbell, CA (US); Parimal Patel, San Antonio, TX (US)

(73) Assignee: XILINX, INC., San Jose, CA (US)

( * ) Notice: Subject to any disclaimer, the term of this patent is extended or adjusted under 35 U.S.C. 154(b) by 165 days.

(21) Appl. No.: 15/676,530

(22) Filed: Aug. 14, 2017

(51) Int. Cl.
*G06F 11/00* (2006.01)
*G06F 13/40* (2006.01)
*G06F 15/78* (2006.01)
*G06F 13/28* (2006.01)
*G06F 11/34* (2006.01)
*G06F 11/36* (2006.01)

(52) U.S. Cl.
CPC ........ *G06F 13/4022* (2013.01); *G06F 11/348* (2013.01); *G06F 11/3466* (2013.01); *G06F 11/364* (2013.01); *G06F 13/28* (2013.01); *G06F 15/7842* (2013.01)

(58) Field of Classification Search
CPC .. G06F 11/3466; G06F 11/36; G06F 11/3636; G06F 11/364; G06F 11/3648; G06F 11/3656; G06F 11/3089; G06F 11/348; G06F 11/3485; G06F 17/5054; G06F 13/28–287; H03K 19/17756; G01R 31/31705
See application file for complete search history.

(56) References Cited

U.S. PATENT DOCUMENTS

| | | | | |
|---|---|---|---|---|
| 7,987,393 B2 * | 7/2011 | Sohm | ................... | G06F 11/3636 714/45 |
| 8,533,655 B1 * | 9/2013 | Konduru | ........ | G01R 31/318519 716/113 |
| 2015/0095715 A1 * | 4/2015 | Nagao | ................. | G06F 11/3636 714/45 |
| 2018/0189642 A1 * | 7/2018 | Boesch | ................. | G06F 17/505 |
| 2018/0322026 A1 * | 11/2018 | Olgiati | ................ | G06F 17/5027 |

OTHER PUBLICATIONS

ChengLiu et al., QuickDough: A Rapid FPGA Loop Accelerator Design Framework Using Soft CGRA Overlay, 2015, IEEE (Year: 2015).*

(Continued)

*Primary Examiner* — Marc Duncan
(74) *Attorney, Agent, or Firm* — Kevin T. Cuenot

(57) ABSTRACT

An integrated circuit can include programmable circuitry configured to implement an overlay circuit specified by an overlay. The overlay circuit can include a trace buffer configured to receive a probed signal from circuitry within the overlay circuit. The trace buffer can be configured to generate trace data from the probed signal and store the trace data in a runtime allocated memory. The integrated circuit also can include a processor coupled to the programmable circuitry and configured to control operation of the trace buffer. The processor can be configured to read the trace data from the runtime allocated memory.

20 Claims, 14 Drawing Sheets

(56) References Cited

OTHER PUBLICATIONS

Eslami, Fatemeh et al., "Enabling Effective FPGA Debug using Overlays: Opportunities and Challenges," In 2nd Int'l. Workshop on Overlay Architectures for FPGAs (OLAF2016), Feb. 21, 2016, pp. 1-6.
Haenel, Valentin, "2.8. Interfacing with C," [online] Scipy Lecture Notes [retrieved Aug. 11, 2017] retrieved from the Internet: <http://www.scipy-lectures.org/advanced/interfacing_with_c/interfacing_with_c.html>, 31 pg.
Catanzaro, Bryan et al., "SEJITS: Getting Productivity and Performance with Selective Embedded JIT Specialization," Programming Models for Emerging Architectures, vol. 1, No. 1, Oct 2009, pp. 1-9.
Capalija, Davor et al., "Tile-based Bottom-up Compilatoin of Custom Mesh-of-Functional-Units FPGA Overlays," In IEEE 24th Int'l. Conf. on Field Programmable Logic and Applications (FPL), Sep. 2, 2014, pp. 1-8, IEEE, Piscataway, New Jersey, USA.
Wikipedia,"Very high-level programming language," [online] Wikipedia, the free encyclopedia, Jun. 25, 2017, retrieved from the Internet: <https://en.wikipedia.org/w/index.php?title=Very_high-level_programming_language&oldid=787427362>, 2 pg.
Amazon, "Amazon EC2 F1 Instances," [online] Amazon Web Services, Inc. © 2017 [retrieved Aug. 11, 2017], retrieved from the Internet: <https://aws.amazon.com/ec2/instance-types/f1/>, 14 pg.

\* cited by examiner

US 10,474,610 B1

HARDWARE TRACE AND INTROSPECTION FOR PRODUCTIVITY PLATFORM USING A SYSTEM-ON-CHIP

TECHNICAL FIELD

This disclosure relates to integrated circuits (ICs) and, more particularly, to a productivity platform that uses a system-on-chip type of IC.

BACKGROUND

A system-on-chip, or "SOC," is an integrated circuit (IC) that includes a processor that is coupled to one or more other circuits. In some cases, the processor and other circuits are implemented on a same die. In other cases, the processor and other circuits are implemented on two or more dies that may be coupled together, e.g., via a common substrate or interposer. In either case, the SOC is packaged and provided as a single IC.

The processor is typically implemented as a hardwired processor that is capable of executing program code. The other circuits coupled to the processor are typically implemented as hardwired circuitry. In some cases, the other circuits include specialty circuits with particular, predetermined functions. These other circuits can operate cooperatively with one another and/or with the processor. In some SOCs, the processor is capable of operating in close coordination with the other circuits.

SUMMARY

One or more embodiments are directed to an integrated circuit (IC). In one aspect, an IC can include programmable circuitry configured to implement an overlay circuit specified by an overlay. The IC can also include a processor coupled to the programmable circuitry and configured to control the programmable circuitry through execution of a framework, wherein the framework provides high-productivity language control of implementation of the overlay in the programmable circuitry.

One or more embodiments are directed to a method. In an aspect, a method can include providing, within an integrated circuit, programmable circuitry configured to implement an overlay circuit specified by an overlay. The method can also include providing, within the integrated circuit, a processor coupled to the programmable circuitry and configured to control the programmable circuitry through execution of a framework, wherein the framework provides high-productivity language control of implementation of the overlay in the programmable circuitry.

One or more embodiments are directed to an IC. In one aspect, an IC can include programmable circuitry configured to implement an overlay circuit specified by an overlay, wherein the overlay circuit includes a trace buffer configured to receive a probed signal from circuitry within the overlay circuit. The trace buffer can be configured to generate trace data from the probed signal and store the trace data in a runtime allocated memory. The IC can include a processor coupled to the programmable circuitry and configured to control operation of the trace buffer, wherein the processor is configured to read the trace data from the runtime allocated memory.

One or more embodiments are directed to a method. In an aspect, a method can include providing, within an IC, a programmable circuitry configured to implement an overlay circuit specified by an overlay, wherein the overlay circuit includes a trace buffer configured to receive a probed signal from circuitry within the overlay circuit. The trace buffer can be configured to generate trace data from the probed signal and store the trace data in a runtime allocated memory. The method can also include providing, within the IC, a processor coupled to the programmable circuitry and configured to control operation of the trace buffer, wherein the processor is configured to read the trace data from the runtime allocated memory.

One or more embodiments are directed to an IC. In one aspect, an IC can include a slave processor configured to execute instructions, wherein the slave processor is implemented in programmable circuitry of the IC. The IC can include a processor coupled to the slave processor, wherein the processor is hardwired and configured to control operation of the slave processor.

One or more embodiments are directed to a method. In an aspect, a method can include providing a slave processor configured to execute instructions, wherein the slave processor is implemented in programmable circuitry of an IC. The method can also include providing, within the IC, a processor coupled to the slave processor, wherein the processor is hardwired and configured to control operation of the slave processor.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
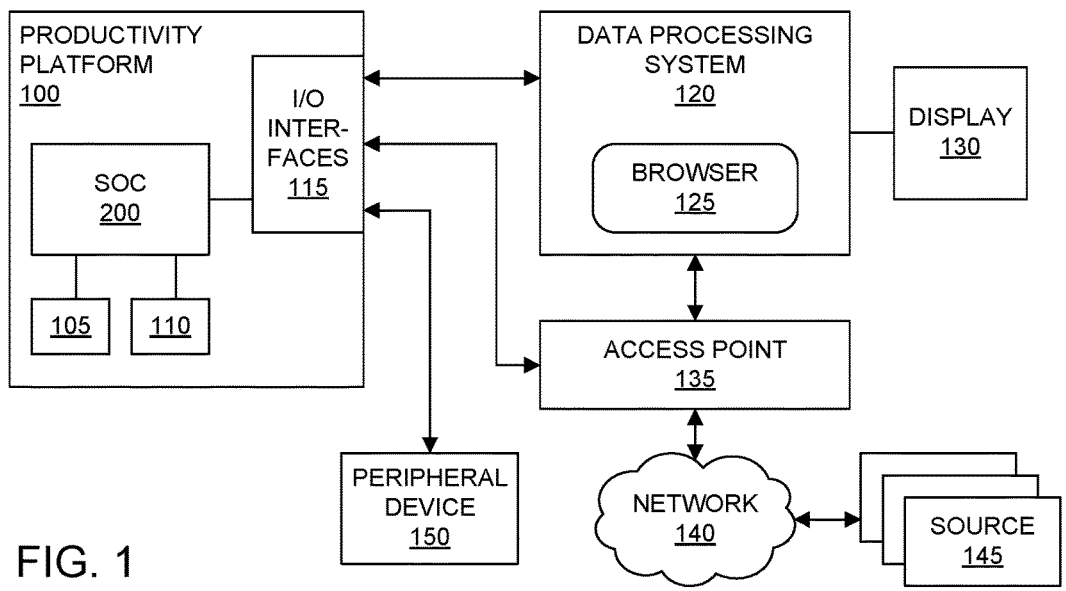
FIG. 1 illustrates an example of a productivity platform that includes a system-on-chip (SOC) type of integrated circuit (IC) having programmable circuitry.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs). One or more embodiments are directed to a productivity platform that uses a system-on-chip (SOC) type of IC. In particular embodiments, the productivity platform provides a configurable hardware platform implemented using the SOC. The SOC includes a processor capable of executing program code (e.g., an operating system and applications) and programmable circuitry coupled to the processor. The programmable circuitry can be controllable by the processor of the SOC. The SOC may include additional hardwired circuits coupled to the processor.

In one or more embodiments, the productivity platform provides an infrastructure that allows an arbitrary overlay to be integrated into a computing environment. The computing environment includes the processor of the SOC. An "overlay" refers to a pre-compiled bitstream specifying a circuit design for implementation within programmable circuitry. An overlay is itself programmable. For example, once an overlay is implemented as an overlay circuit within programmable circuitry, the overlay circuit is programmable. In particular embodiments, the overlay is designed to solve a class of problems. For purposes of discussion, the term "overlay circuit" is used to refer to an overlay that is implemented within programmable circuitry.

In one or more embodiments, the productivity platform includes a framework, e.g., an executable framework. The framework is capable of performing life-cycle management in a high-productivity language (HPL). The framework is capable of providing, or including, APIs for controlling one or more overlays. Examples of the APIs included in the framework can include, but are not limited to, loading or implementing overlays in programmable circuitry, initializing overlays, executing overlays, controlling data interfacing or exchange between overlay(s) and a processor, halting or stopping an overlay, and/or removing an overlay from programmable circuitry.

In particular embodiments, the framework is self-hosted in that the framework is executed by the processor of the SOC used in the productivity platform. In an aspect, the processor of the SOC is an example of an embedded processor of the SOC. In executing the framework, the productivity platform and, in particular the SOC, is capable of providing a browser-enabled interface to other computing devices external or separate from the productivity platform. For example, SOC is capable of operating as a server and providing browser usable data (e.g., program code, markup language, scripts, or other suitable data) to the device. The browser usable data may be natively executable and/or interpretable by the browser.

In one or more embodiments, the productivity platform facilitates development of an overlay application. The development can be performed from a browser of a computing device that is communicatively linked to the productivity platform. An overlay application refers to an application implemented using an HPL that is executable by the processor of the SOC and that is capable of accessing hardware functions of one or more overlay circuits using an HPL API provided for such overlay circuit(s). In particular embodiments, the HPL API of the overlay circuit(s) may include bindings to one or more functions implemented in a high-level programming language (HLL) such as an efficiency level language (ELL) as described hereinbelow.

In one or more embodiments, the productivity platform provides an HPL API for circuitry implemented in the programmable circuitry of the SOC and/or other circuitry of the SOC. The HPL API provides a developer with access to functions performed by the various circuit(s) of the SOC, whether hardwired and/or implemented within programmable circuitry. The processor of the SOC is capable of providing runtime management of various circuits and/or systems implemented within the SOC using the HPL API(s) provided by the framework.

In one or more embodiments, the framework executed by the processor of the SOC includes a server-based integrated development environment (IDE). The server-based IDE is capable of developing programs written in the HPL. Since the framework provides a browser-enabled interface to external computing devices, a user is capable of accessing the server-based IDE using a data processing system that is coupled to the productivity platform and that is capable of executing a standard browser application. Using the framework, hardware and/or software design, e.g., the creation of an overlay application, for the SOC may be performed by or within the SOC itself. The data processing system accessing the productivity platform through the browser does not need any electronic design automation software, compilation software, or other specialized development tools installed on the data processing system in order to develop an overlay application.

In one or more embodiments, the productivity platform is capable of providing hardware trace and introspection. In particular embodiments, one or more probes are implemented within the overlay circuits implemented within the programmable circuitry of the SOC. Operation of the probes can be controlled, in real-time, e.g., during runtime of the SOC, using a processor of the SOC. For example, the HPL API(s) can include functions for controlling the overlay circuits including the probes contained therein. As the probes generate trace data, the trace data can be stored in a memory. The memory may be a program execution memory, e.g., a random access memory (RAM), used by a processor of the SOC. As such, a processor of the SOC, whether hardwired or a soft-processor, is capable analyzing the trace data stored in program execution memory in real-time during runtime. In response to analysis of the trace data, the processor of the SOC is capable of controlling operation of circuits of the SOC, dynamically modifying circuits implemented within the SOC, dynamically removing circuits and/or implementing new circuits within the SOC, and performing other trace related functions. The operations performed by the processor of the SOC are facilitated through the HPL API(s) of the framework.

In one or more embodiments, one or more slave processors are provided within the SOC. The SOC is capable of implementing one or more slave processors as soft-processors in the programmable circuitry. For example, a processor of the SOC acting as a master is capable of instantiating one or more slave processors and controlling operation of the slave processor(s) thereafter. As an illustrative and non-limiting example, the master processor of the SOC is capable of instantiating a soft-processor in the programmable circuitry of the SOC as a slave processor, providing instructions to the slave processor, and providing data to the slave processor. Under control of the master processor, the slave processor is capable of operating on the data by executing the instructions. The master processor further is capable of starting and stopping the slave processor. For example, the hardwired processor is capable of stopping the slave processor, providing new and/or updated instructions and/or new and/or updated data to the slave processor, starting the slave processor, and repeating the process. The hardwired processor is further capable of resetting and/or restarting operation of the slave processor as may be required.

In particular embodiments, the slave processor is capable of operating as a controller for one or more peripheral devices coupled to the SOC. The data and instructions, for example, may be provided by the master processor to the slave processor for execution specifically for controlling a particular peripheral device. The functionality of the slave processor can be changed by the hardwired processor as needed by providing new and/or different instructions and/or data to the slave processor. In this manner, the slave processor is repurposed by the master processor for controlling a different peripheral device by providing new and/or updated instructions and/or new and/or updated data to the slave processor for execution.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a productivity platform 100. Productivity platform 100 is a configurable hardware platform that utilizes an SOC 200. In the example of FIG. 1, productivity platform 100 is implemented as a circuit board having an SOC 200, memory 105, memory 110, and one or more input/output (I/O) interfaces 115 (e.g., ports). In the example of FIG. 1, SOC 200 is implemented as an integrated circuit. As illustrated in the example of FIG. 1, SOC 200 is coupled to memory 105, memory 110, and I/O interfaces 115. SOC 200 is implemented as an IC. SOC 200 is capable of executing a framework (not shown) that exposes HPL control over overlays and the development of overlay applications.

In one or more embodiments, memory 105 is implemented as a local memory. The term "local memory" refers to non-persistent memory device(s) generally used during actual execution of the program code. Examples of local memory include RAM and/or any of the various types of RAM that are suitable for use by a processor during execution of program code such as dynamic RAM (DRAM). Memory 105 is capable of being used by SOC 200, e.g., the hardwired processor contained therein and/or other circuits such as soft-processors, as program execution memory or as a runtime memory.

In one or more embodiments, memory 110 is implemented as a bulk storage device. The term "bulk storage device" refers to a persistent data storage device. Examples of a bulk storage device include, but are not limited to, a hard disk drive (HDD), a solid state drive (SSD), flash memory, and electrically erasable programmable read-only memory (EEPROM). In one or more embodiments, memory 110 is mounted to productivity platform 100. In one or more other embodiments, memory 110 is implemented as a removable memory. For example, memory 110 can be implemented as a card reader and corresponding memory card that is insertable and removable from the card reader. The card reader is capable of receiving the memory card. The memory card can be implemented as a flash memory card or other suitable type of memory card that can be loaded into the card reader and accessed, e.g., read and/or written, by SOC 200.

I/O interfaces 115 include one or more communication ports. In one or more embodiments, I/O interfaces 115 include communication ports such as a Universal Serial Bus (USB) port, an Ethernet port, and/or other suitable communication ports. In one or more embodiments, I/O interfaces 115 include communication ports that are configured for communication with one or more peripheral devices such as peripheral device 150. In particular embodiments, I/O interfaces 115 include one or more Arduino compatible device interfaces. In particular embodiments, I/O interfaces 115 include one or more Pmod compatible interfaces. The Pmod interface, or "Peripheral Module interface," is an open standard defined by Diligent Inc. within the Digilent Pmod™ Interface Specification for peripherals used with field programmable gate arrays (FPGAs) and/or microcontrollers.

In the example of FIG. 1, productivity platform 100 is coupled to one or more other systems. For example, productivity platform 100 is coupled to a data processing system 120, an access point 135, and/or the one or more peripheral devices 150. While productivity platform 100 may be communicatively linked to data processing system 120 and/or access point 135, data processing system 120 and access point 135 are independent, e.g., different, systems than productivity platform 100.

Data processing system 120 can be implemented as any of a variety of computing systems or devices capable of executing a browser 125 (e.g., a browser application). As shown, data processing system 120 can include, or be coupled to, a display 130. Examples of data processing system 120 can include, but are not limited to, a desktop computer, a laptop computer, a tablet computer, a mobile phone or other mobile device, or other suitable computing device capable of executing browser 125. As generally known, a browser refers to a program with a graphical user interface for displaying various types of markup language (e.g., HyperText Markup Language or HTML), text, and other files and is commonly used to navigate the World Wide Web and/or Internet.

Productivity platform 100 is capable of coupling to data processing system 120 through one of I/O interfaces 115. For example, productivity platform 100 is capable of communicating with data processing system 120 through an Ethernet connection, a USB connection, using Ethernet over USB, or another suitable protocol and/or connection. In one or more embodiments, productivity platform 100 is capable of communicating with data processing system 120 wirelessly. The wireless connection may be a direct connection, e.g., peer-to-peer, or via a router or access point such as access point 135. For example, productivity platform 100 is capable of communicating with data processing system 120 via Bluetooth® or another similar wireless communication protocol or via WiFi™ or via another suitable wireless communication protocol.

Access point 135 is implemented as a networking hardware device that allows other devices, e.g., productivity platform 100 and/or SOC 200, to connect to a network such as network 140. In one or more embodiments, access point 135 is implemented as a wireless access point (e.g., a WAP). As an illustrative and non-limiting example, access point 135 can be implemented as a base transceiver station, a repeater, a LAN access point, WLAN access point, or any other system including equipment for communicating with devices whether wired or wirelessly. As such, access point 135 can include one or more antenna elements and one or more components for transmitting and receiving radio frequency (RF) signals (e.g. transceivers). Access point 135 may also include any of a variety of other suitable components such as, for instance, network adapters, communication ports, and controllers.

Network 140 is the medium used to provide communication links between various devices and data processing systems such as sources 145 and/or access point 135. Sources 145, for example, may be remote data processing systems, e.g., servers, networked data storage devices, or other suitable computing system. Network 140 may include connections, such as wire, wireless communication links, or fiber optic cables. Network 140 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

SOC 200 includes a hardwired processor and programmable circuitry. In particular embodiments, SOC 200 is capable of executing a modern operating system and a framework. A framework refers to software (e.g., executable program code) that provides generic functionality that can be selectively changed by additional user-written code, thus providing application-specific software. A framework provides a standard way to build and deploy applications. A framework is a universal, reusable software environment that provides particular functionality as part of a larger platform to facilitate development of software applications, products, and solutions. A framework can include support programs, compilers, code libraries, tool sets, and APIs that bring together di□perent components to enable development of a project or system.

In general, an API refers to a set of subroutine definitions, protocols, and tools for building application software. In general terms, an API is a set of clearly defined methods of communication between various software components. An API describes and prescribes expected behavior, while the library is an actual implementation of this set of rules, e.g., in executable program code. Language bindings are an example of an API. A language binding, e.g., binding an HPL function to a C/C++ method, maps the features and capabilities of one language to an interface implemented in another language. A language binding allows a library or service written in one language to be used when developing in another language.

In particular embodiments, the framework executed by SOC 200 facilitates development of an overlay application. The APIs provided may be HPL APIs that expose hardware functions of circuits implemented within SOC 200 including overlay circuits. In this regard, HPL functions of a library accessible via the HPL API are bound, e.g., associated with, hardware operations of the overlay circuits. One or more of the HPL functions may be bound to lower-level HLL functions, e.g., a C/C++ function.

Typically, development for SOC 200 is performed in a host-target environment where software or hardware for SOC 200 is first developed on a host data processing system such as data processing system 120 and then downloaded to SOC 200 and executed and/or implemented therein. The SOC is referred to as the target. The host-target development environment is characterized by longer compilation and debug times. The host-target environment is further characterized by a significant amount of complexity making such development environments difficult for new users to learn and develop proficiency. The host-target environment typically imposes strict operating system restrictions on the host data processing system in order to utilize the necessary development tools, which must be installed on the host data processing system.

In accordance with the inventive arrangements described herein, the framework executed by the processor of SOC 200 is self-hosting. As such, the processor within SOC 200 is capable of operating as a server that is accessed by data processing system 120. In the example of FIG. 1, the productivity platform provides an environment that utilizes a client-server computing model where the processor in SOC 200 is operating as the server and data processing system 120 is operating as a client.

In the example of FIG. 1, the framework includes a server-based or web-based IDE. The processor of the SOC is capable of executing the server-based IDE, thereby supporting target-only interaction with SOC 200. In other words, development for SOC 200 occurs on SOC 200 itself. A developer need only access SOC 200 via browser 125 executing in data processing system 120. In one or more embodiments, SOC 200 supports software development through one or more HPLs. Examples of HPLs include, but are not limited to, Python, Scala, and R.

Software development can be performed on SOC 200 using an HPL. While hardware development, e.g., the actual design of an overlay, may still be performed on a host data processing system, overlays for circuit designs can be delivered to SOC 200 for implementation therein using one or more software delivery mechanisms included in the framework executed by SOC 200. Examples of software delivery mechanisms that can be used to deliver bitstreams to SOC 200 can include, but are not limited to, Python pip package management, GitHub repositories, and Debian packages.

The overlays are highly configurable. Once an overlay is loaded into SOC 200 and the circuitry specified by the overlay implemented in programmable circuitry of SOC 200 (referred to herein as an "overlay circuit"), the overlay circuit can be further configured using the processor in SOC 200. The overlays and overlay circuits can be tracked, managed, and controlled within the runtime environment provided by the framework. As an illustrative and non-limiting example, an overlay may be a drone control overlay that includes circuits for controlling six motor control subsystems of a drone. Each of these circuits may be configured and controlled independently. While some deployments of the drone control overlay may utilize all size motor control circuits, other deployments may not. The overlay is designed with additional capacity to provide increased flexibility in terms of configuration.

In particular embodiments, overlays are stored within memory 110. In particular embodiments, overlays are stored in one or more of sources 145 (e.g., servers and/or other remote data processing systems) and can be downloaded to productivity platform 100 for storage in memory 110 and/or use within SOC 200. In any case, the overlays can be selected and implemented within SOC 200 under control of the processor within SOC 200 in executing the framework.

As discussed, an overlay refers to a pre-compiled bitstream specifying a circuit design for implementation within programmable circuitry. The overlay is bound, or associated with, additional supporting software referred to as overlay software. The overlay software for a given overlay can include, but is not limited to, an HPL API for the overlay, metadata describing the circuitry included within or implemented by the overlay, drivers of the overlay which may include operating system drivers written in lower-level programming languages (e.g., C/C++) or another ELL, and/or libraries built on top of the drivers. The drivers, for example, are capable of performing tasks such as reading registers, memory mapped I/O, interrupts, and/or accessing a DMA circuit. In particular embodiments, the libraries are written in an HPL and provide a high-level mechanism and abstraction for accessing the low-level APIs exposed by the drivers themselves. Overlay software may also include other software that may be necessary to implement and/or control the overlay circuit. For example, an overlay can include bindings executable by the processor of SOC 200 that may be necessary to facilitate use and/or exploitation of overlay circuit features.

An overlay can be used and reused for a variety of different applications. An overlay and the overlay software can be provided as a loadable library thereby allowing a user to integrate an overlay into a larger application that may be executing in the processor of SOC 200. The overlay, for example, can be integrated into an overlay application by runtime linking of the API for the overlay with application program code that is executable by the processor of SOC 200.

In the example of FIG. 1, productivity platform 100 is capable of providing one or more overlays stored in memory 110 and/or accessing one or more overlays from source(s) 145. In particular embodiments, the hardware functions of the overlay circuits are bound to callable objects of the HPL. In an example, the HPL is Python, Scala, or R. Accordingly, the processor of SOC 200 is capable of selecting an overlay and implementing the overlay using the programmable circuitry of SOC 200. The processor of SOC 200, being coupled to the programmable circuitry of SOC 200, is capable of controlling the hardware functions of the overlay circuit as implemented in the programmable circuitry of SOC 200. The processor of SOC 200 can control the hardware functions of the overlay circuit through the HPL API of the overlay circuit.

Figure 2:
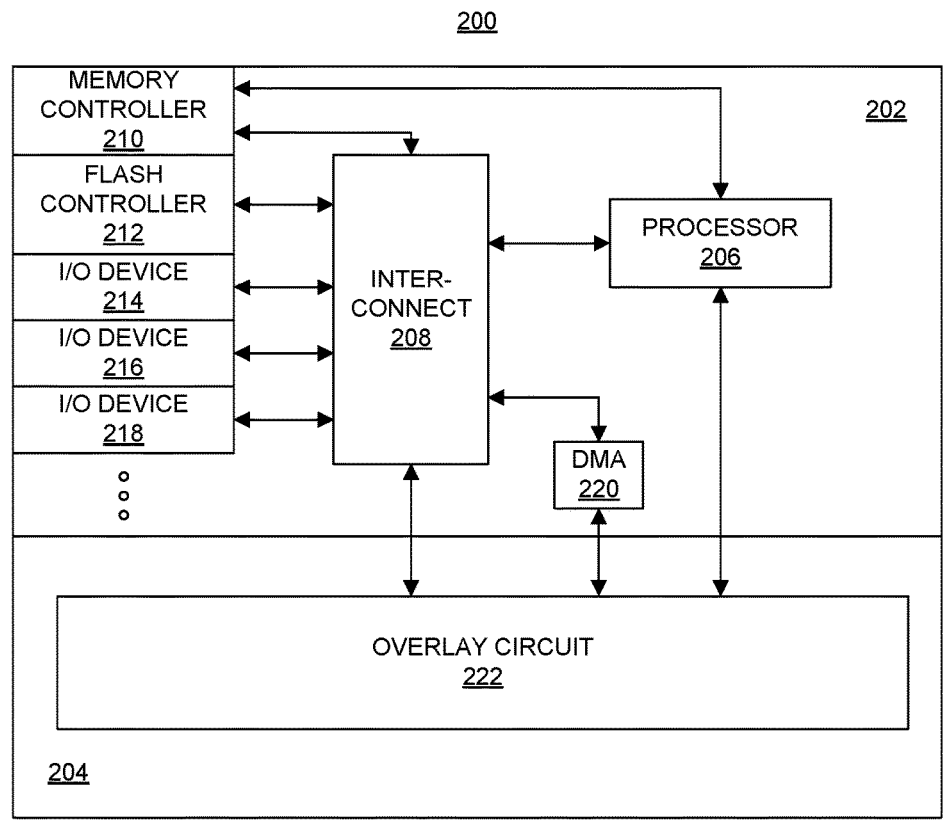
FIG. 2 illustrates an example of the SOC of FIG. 1.

FIG. 2 illustrates an example of SOC 200 of FIG. 1. SOC 200 can include a processor system (PS) 202 coupled to programmable circuitry 204. In general, PS 202 is implemented as a hardwired system within SOC 200. As shown, PS 202 can include a processor 206. Processor 206 can include one or more cores each capable of executing program code. Processor 206 is coupled to an interconnect 208. Interconnect 208 is coupled to a memory controller 210, a flash controller 212, and one or more I/O devices 214, 216, and 218. Processor 206 further may be coupled directly to memory controller 210.

In one or more embodiments, processor 206 is capable of controlling programmable circuitry 204. For example, processor 206 is capable of loading overlays and controlling operation of overlays as described herein. In particular embodiments, programmable circuitry 204 is controllable by another device or system. For example, programmable circuitry 204 may be controlled by a device or system external to SOC 200.

Memory controller 210 is capable of communicating with one or more different types of RAM located external to SOC 200, e.g., off-chip. For example, memory controller 210 is capable of accessing, e.g., reading and/or writing, memory 105. In one or more embodiments, memory controller 210 provides a plurality of ports. For example, processor 206 is capable of accessing a port of memory controller 210. One or more ports of memory controller 210 can be made available to overlay circuits implemented in programmable circuitry 204.

Flash controller 212 is capable of communicating with an off-chip memory such as memory 110. In particular embodiments, flash controller 212 is capable of providing a Quad Serial Peripheral Interface (QSPI), a parallel NOR/SRAM interface, a NAND interface, or other suitable interface. Flash controller 212 can be implemented using any of a variety of suitable and compatible bit-widths. It should be appreciated that PS 202 can include any of a variety of different controllers depending upon the particular memories that are coupled to SOC 200.

I/O devices 214, 216, and/or 218 may implement one or more of a USB interface, an Ethernet interface, a Secure Digital (SD) interface, General Purpose I/O (GPIO) interface, a Universal Asynchronous Receiver/Transmitter (UART) interface, a Serial Peripheral Interface (SPI) bus interface, a Controller-Area-Network (CAN) interface, a Triple Timer Counter (TTC) and/or a Watchdog Timer (WDT) interface, and/or a Joint Test Action Group (JTAG) port or interface.

PS 202 optionally can include a direct memory access (DMA) circuit 220. In the example of FIG. 1, DMA circuit 220 is coupled to interconnect 208 and to programmable circuitry 204. In the example of FIG. 2, DMA circuit 220 is coupled to programmable circuitry 204 and to an overlay circuit 222 implemented therein. In one or more other embodiments, DMA circuit 220 is implemented in programmable circuitry 204 and is connected directly to memory controller 210. In one or more other embodiments, a DMA circuit is included in PS 202 while one or more DMA circuits may also be implemented in programmable circuitry 204.

In particular embodiments, I/O devices 214, 216, and 218 are coupled to a fabric multiplexer input/output (FMIO) interface. Based upon user configuration of SOC 200, and, more particularly, PS 202, any one of I/O devices 214, 216, and/or 218 can be coupled to programmable circuitry 204 via the FMIO interface. This allows data being communicated via any one of I/O devices 214, 216, and/or 218 to be routed to circuitry, e.g., overlay circuit 222, within programmable circuitry 204 for further processing and/or monitoring.

In particular embodiments, PS 202 is coupled to programmable circuitry through one or more interfaces. For example, interconnect 208 can be coupled to programmable circuitry 204 through an interface (not shown). DMA circuit 220 can be coupled to programmable circuitry 204 through an interface (not shown). Processor 206 can be coupled to programmable circuitry 204 through an interface (not shown). In an example, the interfaces can be implemented in accordance with the Advanced Microcontroller Bus Architecture (AMBA) AXI Protocol Specification (AXI) as published by ARM. In general, AXI is a high performance, high frequency interface that is suitable for submicron interconnect. It should be appreciated that PS 202 can be coupled to programmable circuitry 204 using any suitable on-chip interconnects or interfaces.

Programmable circuitry 204 can be implemented to include one or more programmable circuit blocks that can be coupled together using programmable interconnect circuitry. The programmable circuit blocks and the programmable interconnect circuitry can be configured to implement one or more different physical circuits illustrated as overlay circuit 222. In one or more embodiments, overlay circuit 222 is implemented within programmable circuitry 204 as part of an overlay that is selected by processor 206. It should be appreciated that programmable circuitry 204 is not operational or functional until configuration data is loaded within configuration memory of SOC 200 (not shown) thereby causing physical circuitry to be implemented within programmable circuitry 204 and establishing connectivity between the individual circuit elements of the physical circuitry.

Figure 3:
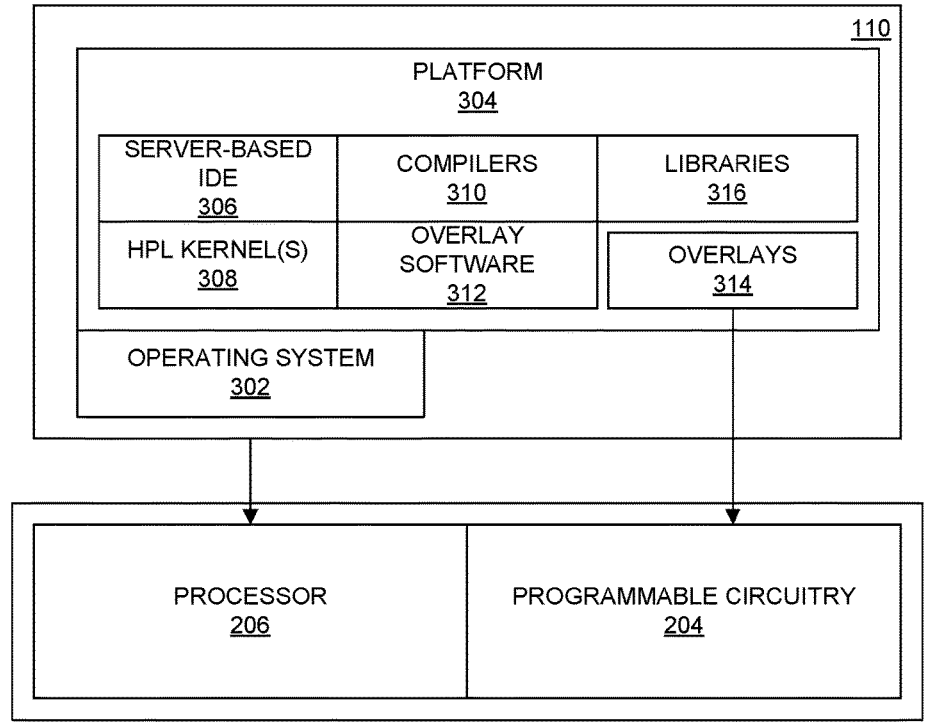
FIG. 3 illustrates an example of data structures stored in a memory that support operation of the productivity platform of FIG. 1.

FIG. 3 illustrates an example of data structures stored in memory 110 of FIG. 1 that support operation of productivity platform 100. In one or more embodiments, memory 110 stores an operating system 302 and a framework 304. Framework 304 can include a server-based IDE 306, one or more HPL kernels 308, one or more compilers 310, one or more overlay software(s) 312, and one or more overlays 314. In general, the components such as operating system 302 and framework 304, with the exception of overlays 314, are executable by processor 206. Overlays 314 are implemented in programmable circuitry 204, albeit under control of processor 206.

In one or more embodiments, the software illustrated in FIG. 3 for productivity platform 100 is delivered as a single image file that may be stored on an SD card or other memory card that may be used to implement memory 110. In an aspect, the image file requires no licenses or host-target tool flows (e.g., no installation of software on data processing system 120 used to access productivity platform 100 via browser 125). The software included on the image file is capable of executing natively on processor 206 of SOC 200.

In particular embodiments, operating system 302 is implemented as a full mainline Linux distribution. In one or more other embodiments, a different operating system can be used. In particular embodiments, server-based IDE 306 is implemented as an open source software solution. In particular embodiments, server-based IDE 306 is implemented as a Web-based IDE. Server-based IDE 306 is capable of supporting one or more different programming languages such as any of the HPLs described herein. In an example, server-based IDE 306 is capable of supporting creation and sharing of documents that contain live program code, equations, visualizations, and explanatory text. As an illustrative and non-limiting example, server-based IDE 306 is implemented as a Jupyter Notebook.

In one or more embodiments, compilers 310 are capable of compiling any of a variety of different program code whether an HLL such as C/C++ or HPLs. In particular embodiments, compilers 310 can implement or include one or more cross-compilers for any non-application processor(s) that may exist or be implemented on productivity platform 100. For example, cross-compilers can be included for soft-processors that may be implemented within the programmable circuitry of SOC 200 and/or for other hardwired processors that may be included on SOC 200, e.g., other than processor 206. In particular embodiments, SOC 200 includes one or more hardwired processors in PS 202 in addition to processor 206. Such additional processors, for example, may be configured to provide real-time control and/or operation for other systems and/or circuits where such functions are not reliably implemented using processor 206, since processor 206 is tasked with executing operating system 302, HPL kernel 308, and server-based IDE 306. Compilers 310 are capable of compiling program code for execution by such processors. Server-based IDE 306, for example, is capable of invoking one or more of compilers 310.

Memory 110 also stores one or more HPL kernels 308. An HPL kernel is a program that is capable of running and introspecting program code written in an HPL. An HPL, for example, may be a scripted language that requires another software component, e.g., a virtual machine or kernel, to execute the scripts. Framework 304 can include one or more different HPL kernels 308, e.g., to support different HPLs.

Memory 110 is capable of storing one or more overlays 314 and the corresponding overlay software 312 for each such overlay. Memory 110 is also capable of storing one or more libraries 316. Libraries 316 can include one or more HPL wrappers of programmable circuitry interfaces implemented by overlays 314. For example, libraries 316 may be Python wrappers of interfaces for overlays 314. The wrappers, for example, are capable of invoking functions coded in C, Fortran, or other optimized ELL type of program code, obtaining results from execution of such functions, and returning the results to the HPL environment. In the case of Python, for example, the wrapper is capable of bypassing the Python kernel (e.g., HPL kernel 308 for Python). In one or more embodiments, wrappers may be implemented using a foreign function interface.

Referring collectively to FIGS. 1-3, productivity platform 100 provides a boot-n-play out of the box experience to a developer. Upon power-up, processor 206 is capable of booting operating system 302 and executing server-based IDE 306. Processor 206 is further capable of executing HPL kernel 308. As such, a developer is immediately able to begin developing for SOC 200 using server-based IDE 306 executing on processor 206. Using server-based IDE 306 executing on processor 206, a developer is able to write, execute, and debug application code written in an HPL. Libraries 316, for example, may also include functions capable of analyzing trace data generated from overlays, controlling the capture of trace data generated from overlays, reacting to trace data generated by overlays, and/or debugging HPL code. As generally noted, since server-based IDE 306 is implemented as a Web-based IDE, data processing system 120 need not have any development tools installed thereon. Data processing system 120 is capable of providing access to server-based IDE 306 via browser 125 executing therein as displayed on display 130.

Accordingly, productivity platform 100 provides HPL support for programmable circuitry control and communication. As such, software execution by processor 206 is capable of driving hardware implementation at runtime. Further, productivity platform 100 provides an out-of-the-box development environment that is host-independent as developers can create software and integrated hardware designs (e.g., overlay applications) by working completely on the target (i.e., SOC 200). In addition, software development relating to developing applications executed by processor 206 can be performed independently of hardware development, e.g., creating overlays.

Figure 4:
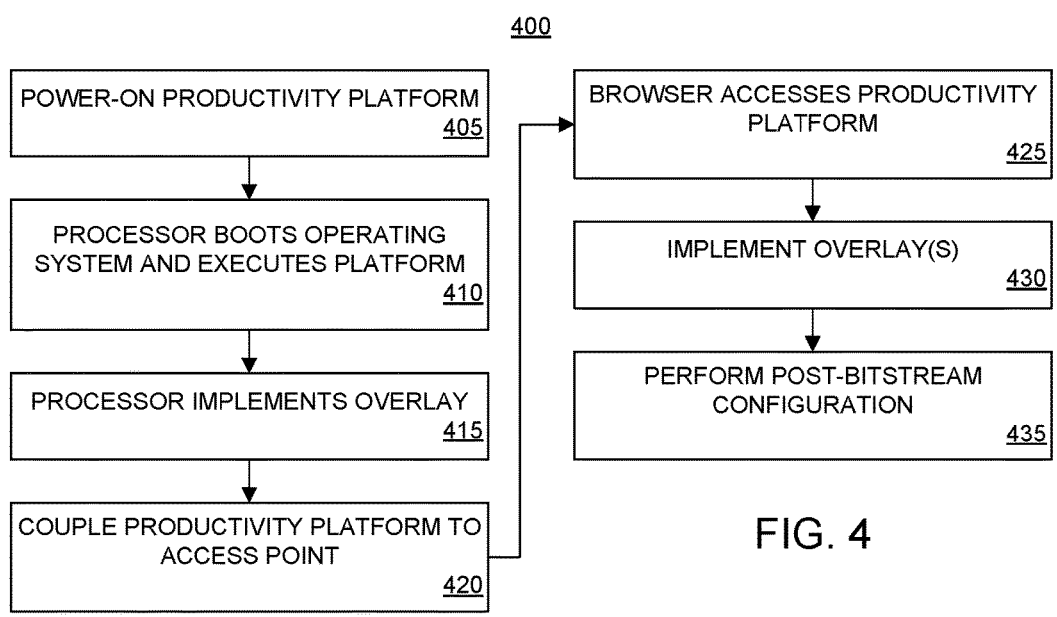
FIG. 4 illustrates an example method of operation for the productivity platform of FIG. 1.

FIG. 4 illustrates an example method of operation for productivity platform 100 of FIG. 1. Method 400 can begin in a state where software for productivity platform 100 is already stored on a memory such as memory 110 accessible by SOC 200 and, more particularly, processor 206 of SOC 200. In an example, a memory card that is pre-loaded with an image file including the program code described herein is inserted into the memory card reader of productivity platform 100. In another example, the memory is coupled or attached to productivity platform 100. The image file can include the software architecture illustrated in FIG. 3.

In block 405, productivity platform 100 is powered-on. For example, productivity platform 100 is coupled to a power supply. In particular embodiments, the power supply is a wall power supply, e.g., an adapter, that is coupled to productivity platform 100. In particular embodiments, productivity platform 100 obtains power from a communications port. For example, a USB port of I/O interfaces 115 can be plugged into the USB port of another device such as data processing system 120, access point 135, or another device or power source to provide power to productivity platform 100.

In block 410, with power supplied to productivity platform 100, SOC 200 begins the boot process. SOC 200 and, more particularly processor 206, is capable of booting operating system 302 and executing framework 304. For example, processor 206 is capable of executing server-based IDE 306 and/or any of the software available in memory 110.

In block 415, processor 206 is capable of implementing an overlay. Processor 206 is capable of retrieving a selected overlay from memory 110. The selected overlay may be a default overlay. Processor 206 is capable of loading the overlay into SOC 200 to implement default circuitry in programmable circuitry 204. Processor 206 is also capable of loading and executing any overlay software for the selected overlay. In one or more embodiments, each overlay is associated or bound to the corresponding overlay software for that overlay. For example, processor 206 is capable of loading and executing any drivers or other software, e.g., an HPL API for the overlay, in order to communicate with the overlay circuit implemented in programmable circuitry 204.

As an illustrative and non-limiting example, library 316 can include a library including one or more functions that are common across different overlays. Such a library, when executed, allows processor 206 to load an arbitrary library as part of the framework. In one or more embodiments, processor 206 is capable of determining, for a given overlay, information about the overlay. The information, for example, may be specified within metadata that is part of the overlay software for the overlay. Examples of information included in the metadata for an overlay include, but are not limited to, what cores and/or slave processors are included in the overlay, the number of such cores and/or slave processors, interfaces for accessing cores and/or slave processors, addresses for accessing cores, slave processors, and/or interfaces. From the metadata, processor 206 is capable of determining which HPL APIs are valid for the overlay that is implemented.

In one or more embodiments, the overlay circuit is a default circuit that is capable of establishing default connections between processor 206 within SOC 200 and the various I/O interfaces 115 of SOC 200. In particular embodiments, the overlay that is selected is bound to data as part of the overlay software that may be used to configure PS 202. For example, the data included in the overlay software is capable of configuring memory controller 210, flash controller 212, and I/O devices 214-218 for operation with processor 206 and the default overlay circuit.

In block 420, productivity platform 100 is coupled to access point 135. Productivity platform 100 is capable of coupling to access point 135 to access data processing system 120 and/or to access or download additional overlays and/or other tools for execution by SOC 200 from various ones of source 145. In particular embodiments, productivity platform 100 is coupled to access point 135 via an Ethernet connection, e.g., an Ethernet cable. In particular embodiments, productivity platform 100 is coupled to access point 135 via a wireless connection. For example, a wireless dongle that is plugged into one of the I/O interfaces 115 of productivity platform 100 may be used.

In one or more embodiments, productivity platform 100 is coupled to access point 135 via a USB over Ethernet connection. In one or more embodiments, productivity platform 100 is capable of connecting directly to data processing system 120. For example, productivity platform 100 is capable of connecting directly to data processing system 120 via a USB connection using the Ethernet over USB communications protocol.

In block 425, browser 125, executing in data processing system 120, is capable of accessing productivity platform 100. For example, browser 125 is pointed to the hostname of productivity platform 100 or to the IP address of productivity platform 100. After block 425, a developer, e.g., a user, is able to develop software for SOC 200 using framework 304 executing in processor 206.

In block 430, processor 206 is capable of implementing different overlays. In one or more embodiments, processor 206, as part of executing framework 304, is capable of implementing different overlays as may be selected by a user. In particular embodiments, an overlay is selected via server-based IDE 306 for immediate implementation and/or testing. In particular embodiments, an overlay is incorporated into an overlay application being developed using server-based IDE 306. In any case, processor 206 is capable of retrieving an overlay selected via server-based IDE 306 from memory 110 and/or a source 145. The overlay may be retrieved using a mechanism such as GitHub cloning or pip package management.

Processor 206 loads the overlay into configuration memory cells of SOC 200 thereby implementing the overlay circuit in programmable circuitry 204. As discussed, processor 206 is capable of executing a library that provides HPL functions for implementing the overlay into programmable circuitry 204. Processor 206 is capable of loading and executing the necessary overlay software for the overlay to communicate and/or control the overlay circuit as implemented in programmable circuitry 204 of SOC 200. As noted, processor 206 is capable of linking the HPL API of the overlay with an application being developed or created in server-based IDE 306. In block 430, processor 206 is capable of delivering hardware, e.g., an overlay, at runtime that matches or suites a user's needs.

In one or more embodiments, processor 206, in executing framework 304, is capable of locally compiling drivers for the overlay circuit that are coded in a programming language such as C or another programming language. The drivers may be wrapped in the high-productivity language.

In block 435, processor 206 optionally performs post-bitstream configuration. Post-bitstream configuration refers to customizing the overlay circuit by modifying behaviour of the overlay circuit and/or modifying the overlay circuit itself after implementation in programmable circuitry 204 of SOC 200.

In one or more embodiments, an overlay is customized after being implemented in programmable circuitry 204 of SOC 200 by including or incorporating one or more runtime customizable elements (RCEs). An RCE is a generic subsystem that can be customized before and during deployment to perform different functions. RCEs can be customized in a variety of ways. Examples of different techniques for customizing an RCE after implementation in programmable circuitry 204 can include, but are not limited to, loading RCEs with executable binaries, loading data memory images into an RCE, writing to configuration registers within the RCEs, loading configuration bits via particular look-up table primitives (e.g., CFGLUT5 primitives), loading configuration bits through bitstream interfaces such as an Internal Configuration Access Port (ICAP) and/or a Processor Configuration Access Port (PCAP), and/or loading configuration bits through serializer-deserializer (SERDES) dynamic reconfiguration ports. The various techniques for customizing RCEs are accessible via HPL APIs provided by the various overlays in which the RCEs are included.

The following are illustrative and non-limiting examples of customizing RCEs in an overlay or other circuit. In particular embodiments, an overlay circuit implements one or more soft-processors. In some examples, the soft-processors are implemented as slave processors. For example, processor 206 is capable of performing post-bitstream configuration of the overlay circuit by loading different instructions into instruction memory of the soft-processor. The instructions may be loaded as an executable binary file. In one or more embodiments, processor 206 is capable of performing post-bitstream configuration of the overlay circuit by loading different data into data memory, e.g., runtime execution memory, of the soft-processor. The data, for example, may be loaded as a data memory image.

In another example, processor 206 is capable of performing post-bitstream configuration of the overlay circuit by loading different data, e.g., a predetermined value or instruction included in the data and stored in the data memory of the soft-processor, that causes the soft-processor to perform a different function or a particular function selected from a plurality of different functions of the executable binary based upon the data value that is read. The value, for example, may be a data item rather than an instruction and can be interpreted by the soft-processor to make a decision or branch a particular way in the executable program code executed by the soft-processor based upon the value of the data that is written. This value may be changed during runtime by processor 206 as opposed to only being changed and/or updated by the soft-processor itself.

In another example, processor 206 is capable of performing post-bitstream configuration of the overlay circuit by loading different data into one or more configuration registers of the overlay circuit.

In another example, processor 206 is capable of performing post-bitstream configuration of the overlay circuit by writing data to one or more selected look-up table circuit blocks available in programmable circuitry 204 and used to implement the overlay circuit. Selected look-up table circuit blocks (e.g., CFGLUT5 primitives) available in programmable circuitry 204 include RAM that may be read and/or written with data during operation of SOC 200 without performing reconfiguration of programmable circuitry 204. A new bitstream, or partial bitstream, need not be loaded into SOC 200 to change the contents of such RAMs of these look-up table circuit block(s).

As such, the functionality of the look-up table circuit blocks can be changed dynamically during runtime by writing to the RAM of the look-up table circuit blocks. The RAM portion of such a look-up table circuit block controls the Boolean function that is implemented by the circuit block. Processor 206 is capable of writing bits to the RAM that specifies the Karnaugh Map that controls the Boolean function that the look-up table circuit block performs.

In another example, processor 206 is capable of performing post-bitstream configuration of the overlay circuit by loading new data into one or more block RAM circuit blocks in programmable circuitry 204 that are used in implementing the overlay circuit.

In another example, processor 206 is capable of performing post-bitstream configuration of the overlay circuit by loading a new and/or different bitstream or a partial bitstream. For example, the overlay circuit may be modified by loading a different bitstream that implements a new or different overlay circuit. The bitstream, for example, may implement a different version of the overlay circuit previously implemented in programmable circuitry 204.

In another example, processor 206 is capable of initiating and/or performing partial reconfiguration to change a portion of the overlay circuit. Partial reconfiguration is a process where a region of programmable circuitry 204, e.g., of an overlay circuit, is dynamically reconfigured by loading a partial bitstream into the configuration memory cells. The partial bitstream, for example, may specify different circuitry and/or a different system than previously implemented in the region. The region may undergo modification through partial reconfiguration while other regions of the overlay circuit implemented within programmable circuitry 204 continue to operate without interruption. As such, a portion of the overlay circuit, e.g., the region that is undergoing partial reconfiguration, is modified and/or changed through partial reconfiguration while those portions of the overlay circuit not in the designated region are capable of continued and uninterrupted operation.

In another example, processor 206 is capable of performing post-bitstream configuration of the overlay circuit by modifying the behavior of one or more interfaces of the overlay circuit. For example, in some overlay circuits, multiplexers and/or a switch matrix may be used to couple I/O pins with different internal nodes or I/O pins of the overlay circuit and/or I/O pins of SOC 200. Some overlay circuits include a SERDES circuit. Processor 206 is capable of modifying operation of the overlay circuit by providing different control signals to the multiplexer, switch matrix, and/or SERDES as the case may be to dynamically change operation of such circuit blocks and/or interfaces during operation of the overlay circuit, e.g., at runtime.

It should be appreciated that the various ways described herein for performing post-bitstream configuration further may be performed in a variety of different scenarios. In one example, any programs and/or data used for post-bitstream configuration may be generated a priori, e.g., at compile time. In another example, any programs and/or data used for post-bitstream configuration may be generated at deployment time within productivity platform 100, e.g., dynamically. In another example, any programs and/or data used for post-bitstream configuration may be generated elsewhere, e.g., by another system remote from productivity platform 100, and delivered to productivity platform 100 during deployment and/or runtime. For example, productivity platform 100 is capable of receiving pre-compiled programs and/or data from the remote data processing system. The remote data processing system may generate the pre-compiled program(s) and/or data or obtain the pre-compiled program(s) and/or data from another system.

Productivity platform 100 is capable of being used in a variety of different applications. As an illustrative and non-limiting example, productivity platform 100 can be used for embedded data analytics. Server-based IDE 306 is capable of handling rich multimedia content for live monitoring applications that have large data requirements. Productivity platform 100 is capable of performing real-time data capture using an overlay circuit implemented in programmable circuitry 204, while networking and visualization can be performed concurrently by processor 206 executing operating system 302 and server-based IDE 306.

As another illustrative and non-limiting example, productivity platform 100 can be used for electronic design automation-style hardware debug and/or for monitoring by the target itself. Conventional hardware monitoring entails using a host-target interaction where the host is used to create visualizations. Productivity platform 100 is capable of using an overlay that is configured for debug, e.g., tracing hardware signals and/or monitoring selected signals, and providing analysis and/or visualizations of the collected trace data using processor 206 executing server-based IDE 306. Productivity platform 100 is capable of providing this functionality without interacting with a host data processing system or relying on such a system for performing analysis and/or generating the visualizations.

As another illustrative and non-limiting example, productivity platform 100 can be used to provide a microcontroller (e.g., one or more soft-processors) and microcomputer (e.g., PS 202) on a single chip. An overlay implemented in SOC 200, for example, is capable of implementing a first soft-processor for a first specialized task (e.g., video processing) and a second soft-processor (or more) for a second specialized task (e.g., managing a motor controller in a robotics application).

Figure 5:
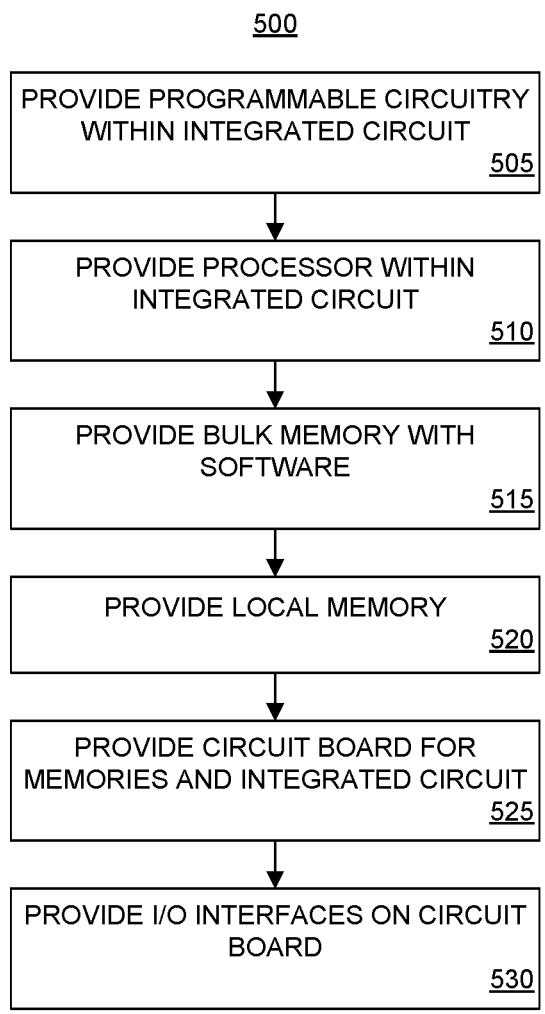
FIG. 5 illustrates an example method of implementing a productivity platform.

FIG. 5 illustrates an example method 500 of implementing or manufacturing a productivity platform 100. In block 505, programmable circuitry is provided within an IC. The IC may be an SOC. The programmable circuitry is capable of implementing, e.g., is configured to implement, circuit designs such as overlays. The overlay, once implemented, is capable of performing one or more hardware operations.

In block 510, a processor is provided within the IC. In particular embodiments, the processor is hardwired. The processor is coupled to the programmable circuitry. The processor is capable of executing a framework. The framework can include a variety of different types of software as described herein including, for example, an HPL API implemented for controlling operation of the programmable circuitry and/or the hardware operations available from an overlay.

In block 515, a bulk memory is provided. The bulk memory is coupled to the IC. For example, the bulk memory can be coupled to a circuit board to which the IC is also coupled. The bulk memory is capable of storing an operating system and a framework as described herein.

In block 520, a local memory is provided. The local memory can be coupled to the circuit board to which the IC is coupled. The local memory can serve as runtime memory, e.g., program execution memory, for the processor.

In block 525, a circuit board is provided. The integrated circuit and the memories can be coupled to the circuit board. In block 530, one or more I/O interfaces are provided on the circuit board. The integrated circuit is coupled to the memories. Further the integrated circuit is coupled to the I/O interfaces.

Figure 6:
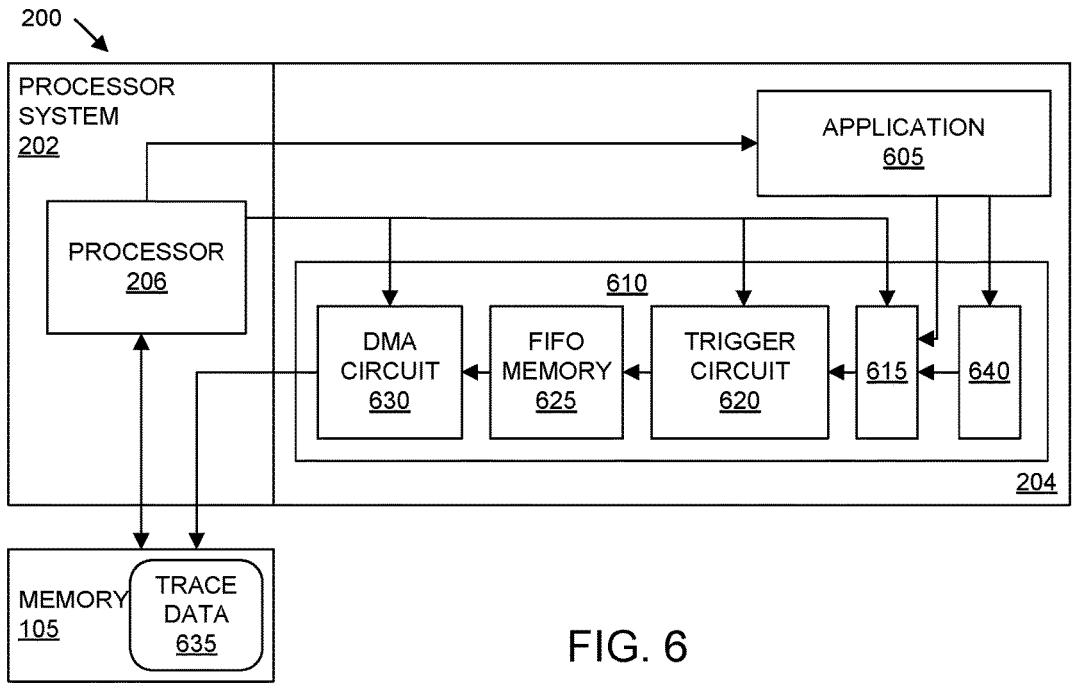
FIG. 6 illustrates an example implementation of an SOC including probe capabilities.

FIG. 6 illustrates an example implementation of SOC 200 including probe capabilities. The probe capabilities described within this disclosure facilitate hardware level introspection. SOC 200, for example, is capable of inspecting its own state of execution within programmable circuitry 204 at a particular time, periodically, and/or continuously, and exploit that state to perform operations in response thereto. In the context of programmable circuitry 204, typically probe capabilities are included in a circuit for debugging purposes and, after debugging, are removed. An external or separate data processing system is used to analyze the trace data that is collected.

Rather than include probe capabilities within a circuit design only for purposes of debugging, probe capabilities can be included in an overlay and remain in the overlay to introspect the hardware. Processor 206, for example, is capable of examining properties of the hardware, e.g., circuitry implemented in the programmable circuitry, at runtime. Since processor 206 is capable of configuring programmable circuitry 204, controlling programmable circuitry 204, and analyzing trace data generated by the trace buffer circuitry implemented in programmable circuitry 204, processor 206 is capable of making decisions based upon the trace data at runtime, e.g., in real-time.

As an illustrative and non-limiting example, processor 206 is capable of analyzing trace data obtained from an interface (e.g., an I/O interface) of an overlay circuit. Processor 206 is capable of determining the particular protocol of the trace data and, in response to identifying the protocol used within the trace data, deploy a different overlay or perform post-bitstream configuration of the overlay circuit already implemented to correctly handle the signals of the interface based on the detected protocol.

In the example of FIG. 6, SOC 200 has an overlay implemented therein. The overlay includes an API that can be executed by processor 206 of PS 202. The overlay, when loaded into configuration memory cells of SOC 200, implements the overlay circuit shown in programmable circuitry 204. In the example of FIG. 6, the overlay circuit includes a circuit block labeled application 605 and a trace buffer 610.

Application 605 can be any of a variety of circuits. Application 605, for example, may be a controller, an audio processor, a video processor, or other specialized circuit. For purposes of discussion, application 605 illustrates a circuit block or blocks representing the core functionality of the overlay. For example, if the overlay is a video processor, application 605 represents the circuitry that performs image processing of the overlay while trace buffer 610 performs the probing functions. In the case where the overlay is a drone-control overlay, application 605 represents the one or more circuit blocks that provide drone control functions such as motor control circuits.

Trace buffer 610 implements the probe capability. In the example of FIG. 6, trace buffer 610 includes an optional analog-to-digital converter (ADC), an optional switch 615, a trigger circuit 620, a first-in-first-out (FIFO) memory 625, and a DMA circuit 630. DMA circuit 630 is capable of interacting with a memory controller (not shown) located in PS 202 for reading and/or writing to memory 105.

In the example of FIG. 6, processor 206 is capable of controlling the overlay including application 605 and trace buffer 610. As pictured, processor 206 is coupled to application 605. Processor 206 is capable of starting and stopping operation of application 605. Processor 206 further is capable of providing data to application 605 for processing and receiving results from application 605. Processor 206 is coupled to switch 615, to trigger circuit 620, and to DMA circuit 630. As such, processor 206 is capable of controlling operation of switch 615, trigger circuit 620, and DMA circuit 630.

In one or more embodiments, processor 206 is coupled to ADC 640 (not shown). Accordingly, processor 206 is capable of controlling operation of ADC 640. For example, processor 206 is capable of changing the sampling rate of ADC 640 and/or the number resolution of samples generated by ADC 640 (e.g., the number of bits of each sample).

In the example of FIG. 6, one or more signals are routed from application 605 to switch 615 and/or to ADC 640. For example, analog signals can be routed to ADC 640, while digital signals can be routed to switch 615. Switch 615 is capable of receiving a first set of signals from application 605 and/or any digitized signals passed from ADC 640. Switch 615 is capable of passing a selected subset of signals to trigger circuit 620. In one or more embodiments, the particular subset of signals passed to trigger circuit 620 by switch 615 is determined by processor 206. Inclusion of switch 615 allows a larger number of signals of application 605 to be coupled to trace buffer 610 that can be probed. For example, trace buffer 610 may only be able to actively monitor a limited number of signals, e.g., 64 signals. More than 64 signals may be routed from application 602 to switch 615. Switch 615, which may be implemented as a multiplexer, can be controlled, during operation, by control signals provided from processor 206 to determine or select which ones of the signals are to be passed to trigger circuit 620. In this manner, an application executed by processor 206 is capable of choosing which ones of the signals of application 605 are monitored by trace buffer 610 and under what conditions. Processor 206 is capable of instructing switch 615 as to which signals to pass at runtime, e.g., in real-time, to dynamically change the particular signals that are probed or evaluated at any given time.

Trigger circuit 620 is capable of monitoring the signals passed by switch 615 to detect particular conditions. In particular embodiments, processor 206 is capable of controlling trigger circuit 620. For example, processor 206 is capable of arming (e.g., starting) and disarming (e.g., stopping) operation of trigger circuit 620. In this regard, processor 206 is capable of specifying the particular conditions monitored for by trigger circuit 620 to store sampled signals in FIFO memory 625. In particular embodiments, trigger circuit 620 is capable of continually storing sampled signals in FIFO 625 as opposed to storing sampled signals only in response to detecting particular conditions.

In one or more embodiments, processor 206 is capable of specifying the conditions monitored for through one of the post-bitstream configuration processes described herein. Processor 206, for example, is capable of providing instructions to trigger circuit 620 specifying the conditions to be detected in order to store sample signals. As such, the conditions used by trigger circuit 620 can be changed and/or updated by processor 206 during runtime, e.g., in real-time.

DMA circuit 630 reads the sampled signal(s) from FIFO memory 625 and writes the sampled signals to memory 105 as trace data 635. Once armed and operating, trigger circuit 620 is capable of storing samples of the signal or signals within FIFO memory 625. FIFO memory 625 is capable of performing write mismatch resolution. On the input side of FIFO memory 625 at trigger circuit 620, signals are sampled at a high rate. For example, signals may be sampled at approximately 100 MHz continuously. At the back end of FIFO 625 at DMA circuit 630, DMA circuit 630 reads data from FIFO memory 625 and writes the data to memory 105, e.g., DRAM. DMA circuit 630 is capable of accessing a port on memory controller 210 described in connection with FIG. 2. Since other circuits are capable of accessing memory 105 via memory controller 210, there may be contention for writing data to memory 105. FIFO memory 625 alleviates backpressure in the event that sampled signals must be temporarily stored until DMA circuit 630 is able to continue writing data to memory 105.

In one or more embodiments, processor 206 is capable of controlling operation of DMA circuit 630. Processor 206, for example, is capable of instructing DMA circuit 630 to begin writing data to memory 105 and/or stop writing data to memory 105. Further, processor 206 is capable of specifying the particular addresses of memory 105 to which trace data 635 is written. In one or more embodiments, processor 206 is capable of dynamically allocating space in memory 105 for storing trace data 635. Processor 206 is capable of informing or instructing DMA circuit 630 of the allocated address range to be used in memory 105 for storing trace data. Processor 206 is capable of reading and processing trace data 635 from memory 105. Inclusion of FIFO memory 625 facilitates increased throughput to memory 105.

In moving data from programmable circuitry 204 to PS 202, the data moves from a physical memory space (in programmable circuitry 204) to a memory management unit (MMU) managed virtual memory space. Memory that is addressable by PS 202 is a virtual memory address and an MMU (not shown) handles the virtual page tables. In programmable circuitry 204, there is no MMU. Memory addresses in programmable circuitry 204 are physical memory addresses. In one or more embodiments, DMA circuit 630 is capable of performing memory domain crossing by translating between virtual memory addressing and physical memory addressing.

In one or more embodiments, when allocating space within memory 105, processor 206 is capable of executing a utility that is capable of reserving a portion of contiguous memory in memory 105. The reserved portion is removed from the virtual memory and no longer managed by the MMU. Once reserved, the portion of memory becomes addressable physical memory. In particular embodiments, processor 206 receives a pointer to the portion of memory and provides the pointer to DMA circuit 630. DMA circuit 630 accesses memory 105 via the port of memory controller 210 using the memory address received from processor 206. Once finished writing data, DMA circuit 630 is capable of informing processor 206 that data is ready and may be read.

Processor 206 is capable of analyzing trace data 635. In one or more embodiments, trace data 635 is stored in the portion of memory 105 that is allocated for trace buffer 610. The portion of memory may be the reserved portion of memory that is no longer managed by the MMU, at least until the portion of memory is re-allocated or de-allocated by processor 206. Processor 206, for example, is capable of executing a program specified in an HPL as discussed. The program may specify the particular analysis of trace data 635 to be performed by processor 206. Accordingly, processor 206 is capable of performing any of a variety of different actions in response to detecting predetermined conditions within trace data 635.

In one or more embodiments, processor 206 is capable of performing post-bitstream configuration on the overlay circuit implemented in programmable circuitry 204 in response to detecting a particular condition in trace data 635. In one or more embodiments, processor 206 is capable of controlling switch 615 to pass different ones of the probed signals to trigger circuit 620 in response to detecting a particular condition from trace data 635. In one or more embodiments, processor 206 is capable of implementing a completely new overlay with an SOC 200 and, as such, a new overlay circuit within programmable circuitry 204. In one or more embodiments, processor 206 is capable of providing a visualization of trace data 635 to data processing system 120, e.g., to browser 125.

Figure 7:
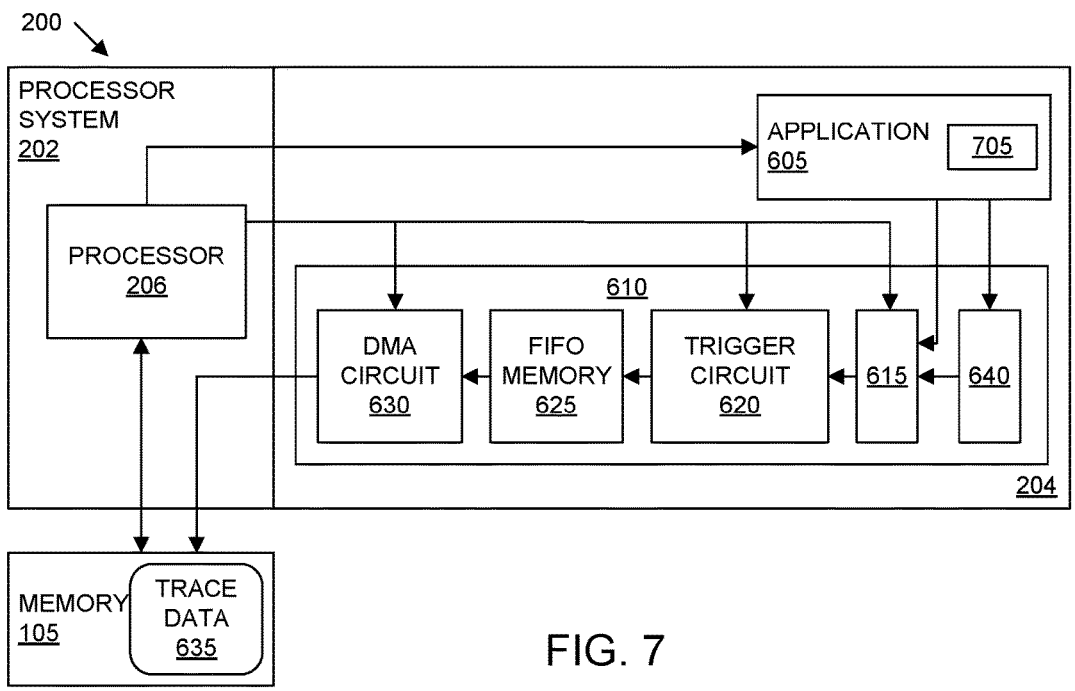
FIG. 7 illustrates another example implementation of an SOC including probe capabilities.

FIG. 7 illustrates another example implementation of SOC 200 including probe capabilities. In the example of FIG. 7, signals from a region 705 of interest in application 605 are probed. The signals from region 705 are passed by switch 615 to trigger circuit 620.

In one or more embodiments, region 705 is an I/O interface of the overlay circuit and of application 605. Accordingly, signals from the I/O interface are processed by trace buffer 610. Sampled signals are stored in memory 105 as trace data 635. Processor 206 is capable of analyzing trace data 635. As an illustrative and non-limiting example, processor 206 is capable of analyzing trace data 635 and determining a type of interface implemented by region 705 (e.g., where region 705 implements an I/O interface). Processor 206, for example, is capable of determining whether the I/O interface is an $I^2C$ interface or an SPI interface based upon an analysis of trace data 635.

In one or more embodiments, region 705 is a dynamically reconfigurable region that may be changed as part of performing partial reconfiguration. Accordingly, the signals that are probed include signals of the interface between region 705 and other portions of application 605 that are static, e.g., not dynamically reconfigurable.

In general, since the overlays are precompiled, the regions of interest, e.g., the signals of interest, are generally known and are preconfigured for probing by routing such signals (e.g., copies thereof) to trace buffer 610. As an illustrative and non-limiting example, processor 206 is capable of managing the reconfiguration control schedule for region 705 based upon signals probed by trace buffer 610. Processor 206, for example, is capable of dynamically reconfiguring region 705 to implement different circuitry therein in response to detecting one or more different conditions from trace data 635 during runtime. In this manner, processor 206 is capable of not only performing debugging functions live as programmable circuitry 204 operates, but is also capable of modifying operation of programmable circuitry 204, modifying overlays implemented in programmable circuitry 204, or implementing entirely different circuits within programmable circuitry 204 based upon an analysis of trace data 635 and detection of one or more conditions therein. As noted, processor 206 is capable of executing a library or libraries relating to analysis of trace data and controlling trace buffer 610.

Trace buffer 610 is capable of monitoring signals that are internal to the overlay implemented in programmable circuitry 204 and/or signals that may be received by an I/O interface of the overlay circuit from a source external to SOC 200. Further, since the overlay circuit implemented in programmable circuitry 204 has an associated HPL API, processor 206 is capable of accessing the functionality of trace buffer 610 by way of that HPL API. In one or more embodiments, the arming software for trace buffer 610 and/or the buffer management software may be integrated into existing debugging technologies such as the GNU Project Debugger (GDB) or Python's debugging module PDB that may be included in framework 304 and, as such, executed by processor 206. The various features described herein in connection with processor 206 for controlling operation of trace buffer 610 are facilitated through the HPL API of the overlay and may be used as part of a re-usable library with other software programming libraries.

Figure 8:
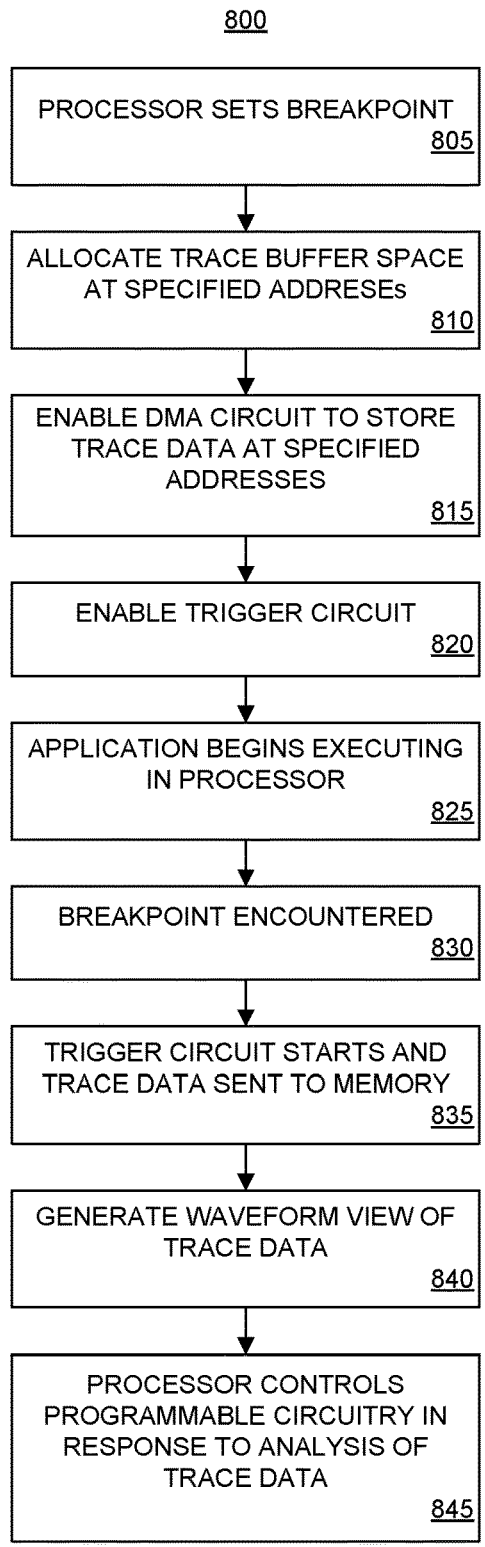
FIG. 8 illustrates an example method of probing signals.

FIG. 8 illustrates an example method 800 of probing signals. Method 800 can be implemented by an SOC as described herein with reference to FIGS. 1-7. Method 800 can begin in a state where an overlay is implemented within SOC 200. Accordingly, an overlay circuit is implemented within programmable circuitry 204 with probe capabilities included therein as generally described with reference to FIGS. 6 and/or 7. The operations described in connection with FIG. 8 are performed entirely within SOC 200. A separate or external data processing system is not required.

In block 805, processor 206 is capable of setting a breakpoint. For example, as part of executing server-based IDE 306, processor 206 is capable of setting a breakpoint within an application that is being developed therein. The application, as noted, can be implemented in an HPL.

In block 810, processor 206 is capable of dynamically allocating space within memory 105 for use by trace buffer 610. The space within memory 105, being a runtime memory of processor 206, is runtime allocatable to trace buffer 610. In this regard, the memory allocated to trace buffer 610 is not dedicated solely for debugging and/or introspection. Processor 206 is capable of re-allocating the portion of memory 105 that is allocated to trace buffer 610 for other tasks in response to a condition such as discontinuing tracing during runtime, e.g., in real-time.

By allocating an address range from memory 105 for storing trace data, trace buffer 610 requires a small amount of memory for purposes of buffering. In particular embodiments, trace buffer 610 utilizes only a small portion of random access memory blocks (BRAM) to implement FIFO memory 625. In conventional systems that perform probing and data collection, a large amount of memory on the chip, e.g., within programmable circuitry 204, is reserved for storing trace data 635. Once allocated for this purpose, the memory resources may only be utilized for this purpose until programmable circuitry 204 is reconfigured by loading a new bitstream. Thus, the ability to allocate memory at runtime for purposes of storing trace data saves a significant amount of resources that may be used for other purposes.

In block 815, processor 206 enables DMA circuit 630 to store trace data at specified addresses in memory 105. For example, as part of enabling DMA circuit 630, processor 206 is capable of notifying DMA circuit 630 of the address and/or address range in memory 105 that has been allocated for storing trace data therein.

In block 820, processor 206 enables trigger circuit 620. In block 825, processor 206 begins executing the application with the breakpoint included therein. In block 830, processor 206 encounters the breakpoint in executing the application. In block 835, in response to encountering the breakpoint, trigger circuit 620 starts operation. Processor 206, for example, in response to encountering the breakpoint, starts trigger circuit 620. Accordingly, trigger circuit 620 begins checking probed signals received therein for one or more predetermined conditions.

In one or more embodiments, trigger circuit 620 is capable of storing samples in FIFO memory 625 only after being started and in response to detecting particular conditions (e.g., signal values and/or signal value combinations) in the signals being probed. In particular embodiments, trigger circuit 620 is capable of continuously storing trace data once started without first detecting a particular condition in the signals being probed. Trigger circuit 620 stores sampled signals, e.g., trace data 635, in FIFO memory 625 and DMA circuit 630 moves sampled signals from FIFO memory 625 to memory 105 as trace data 635.

In one or more embodiments, trace buffer 610 can be armed synchronously with the starting of other circuits in programmable circuitry 204. As an illustrative and non-limiting example, trigger circuit 620 is capable of receiving one or more signals to be evaluated from a first circuit block of the overlay. Trigger circuit 620 is capable of analyzing the signals to detect a trigger condition. In response to detecting a trigger condition from the signals received from the first circuit block of the overlay, trigger circuit 620 is capable of sampling signals received from a second and different circuit block of the overlay.

In one or more embodiments, trace data 635 is compressed. For example, processor 206 is capable of compressing trace data 635 when written to memory 105. In another example, trigger circuit 620 may be configured to compress trace data 635 that is generated in response to detected conditions.

In particular embodiments, trace data 635 is stored in a data structure in memory 105 that supports timeline integration with software tools (e.g., debuggers and/or profilers) or hardware tools that provide visualizations such as waveform views and protocol decoders. As an illustrative and non-limiting example, trace data 635 may be processed by processor 206 and written in the JSON (JavaScript Object Notation) format or as a JSON file.

In block 840, processor 206 is capable of optionally generating a visualization of trace data 635 stored in memory 105. In executing server-based IDE 306, for example, processor 206 is capable of providing the visualization to a client system such as data processing system 120 executing a browser 125 therein. Accordingly, browser 125 is capable of displaying the visualization upon display 130.

In block 845, processor 206 optionally controls programmable circuitry 204 in response to analyzing trace data 635. For example, processor 206 is capable of analyzing trace data 635 in memory 105 and detecting one or more conditions therein. Example of conditions in the trace data include, but are not limited to, a particular pattern or sequence of values, particular signals having particular values at a given time or in a timing sequence (e.g., in one or more sequential samples), or a combination thereof. Processor 206 is capable of controlling programmable circuitry 204 and any of the various ways described herein. For example, processor 206 is capable of implementing a new overlay or implementing post-bitstream configuration of the currently implemented overlay circuit.

In particular embodiments, measurement sequences can be scripted within processor 206. For example, measurement sequences performed by trace buffer 610 can be scripted within processor 206, checked against expected values, and perform further iterations based upon the intermediate results obtained.

In one or more embodiments, processor 206 is capable of processing trace data 635 and writing trace data 635 to memory, e.g., memory 105, in a different form. In an illustrative and non-limiting example, processor 206 is capable of writing trace data using JSON format or as a JSON file. Example 1 illustrates trace data 635, as generated by trace buffer 610 after JSON formatting performed by processor 206.

Example 1

```
import wavedrom
mem_if={"signal": [
    {"name": 's_clk', "wave": 'P . . . '},
    ['output',
    {"name": 'valid', "wave": '0 . . . 1 . . . '},
    {"name": 'busy', "wave": '10 . . . 10 . . . '},
    {"name": ' "data"', "wave": 'x . . . 33.333', "data":['D0',
       'D1', 'D2', 'D3', 'D4', 'D5', 'D6', 'D7', 'D8', 'D9']},
    {"name": 'rdcnt', "wave": '4.44444.444', "data":['0', '1',
       '2', '3', '4', '5', '6', '7', '8', '9', '10']},
    ],{ },
    ['sram',
    {"name": 'cs0', "wave": '0, 1 . . . 01 . . . '},
    {"name": 'we0', "wave": '1 . . . '},
    {"name": 'addr0', "wave": '5 . . . 55555.55', "data": ['0',
       '1', '2', '3', '4', '5', '6', '7', '8', '9']},
    {"name": 'dout', "wave": 'x . . . 33333.3', "data": ['D0',
       'D1', 'D2', 'D3', 'D4', 'D5', 'D6', 'D7']},
    ],
],
    "config": {"hscale": 2},
    "head": {"text": 'Memory Interface Waveform', "tick": 0,
    },
    "foot": {"text": 'Modified from original: <<URL for
       TxRx-Wavedrom at github', "tick": 0
    ],
}
```

Figure 9:
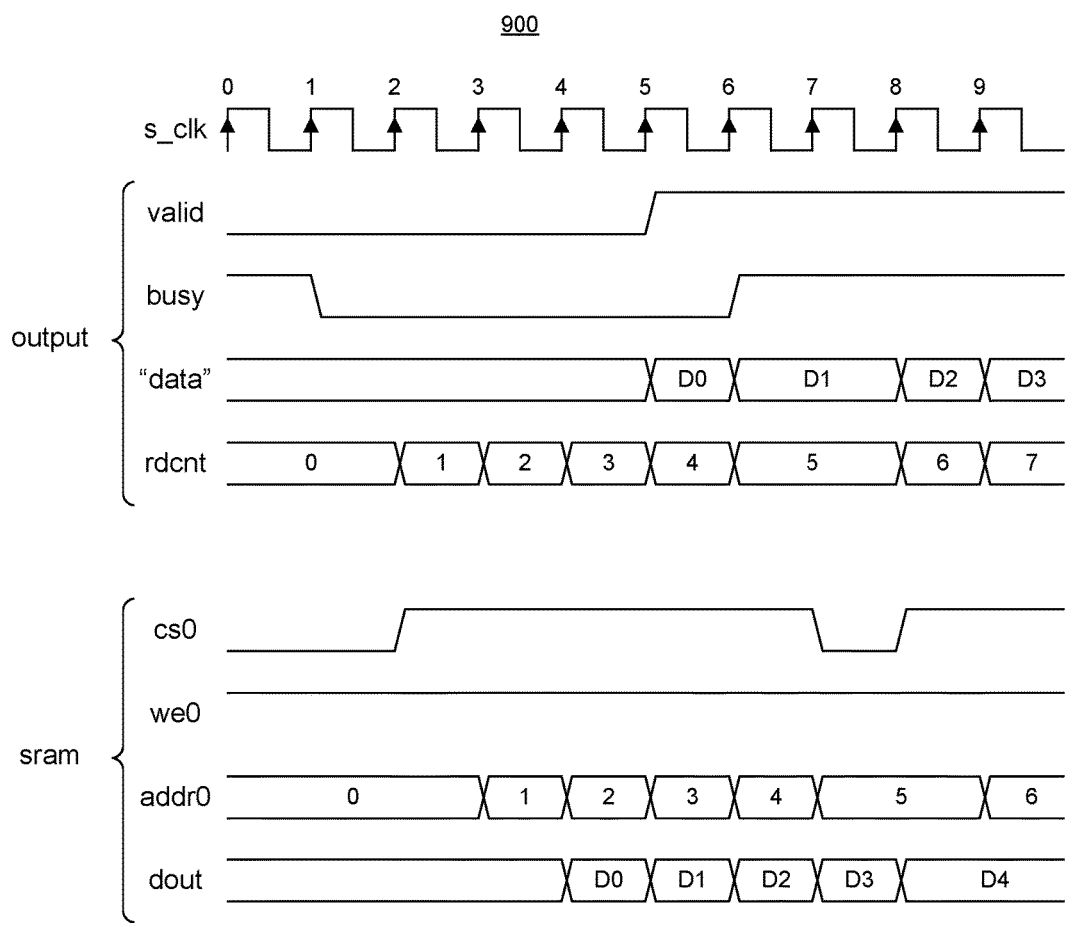
FIG. 9 illustrates an example waveform view generated by the processor of the SOC.

FIG. 9 illustrates an example visualization 900 that is generated by processor 206 of SOC 200. Visualization 900 is generated by processor 206 in executing server-based IDE 306. In the example of FIG. 9, visualization 900 is a waveform view. Processor 206 is capable of generating any of a variety of different visualization types. As such, use of a waveform view as an example is not intended to be limiting. Processor 206, for example, is capable of processing trace data 635. In the example of FIG. 9, visualization 900 is generated from the JSON formatted trace data of Example 1. As discussed, visualization 900 can be provided by processor 206 to an external system such as data processing system 120 for viewing using browser 125. JSON files, for example, are natively executable using browser 125. In one or more embodiments, processor 206 is capable of including or displaying a visualization such as visualization 900 within a Jupyter notebook executing on processor 206.

In the example of FIG. 9, because the overlays are pre-configured, signal names are known a priori. In particular embodiments, the metadata of an overlay, for example, can describe pin locations and signals of the overlay and provide names or labels for the signals and/or pin locations of the overlay that are probed. Accordingly, in generating visualization 900, processor 206 is capable of automatically labelling signals within the JSON formatted trace data of Example 1 based upon the metadata of the overlay and further labelling the signals shown in visualization 900. As such, one need not manually create labels for a waveform view or other visualization generated using the probing functionality described herein.

Figure 10:
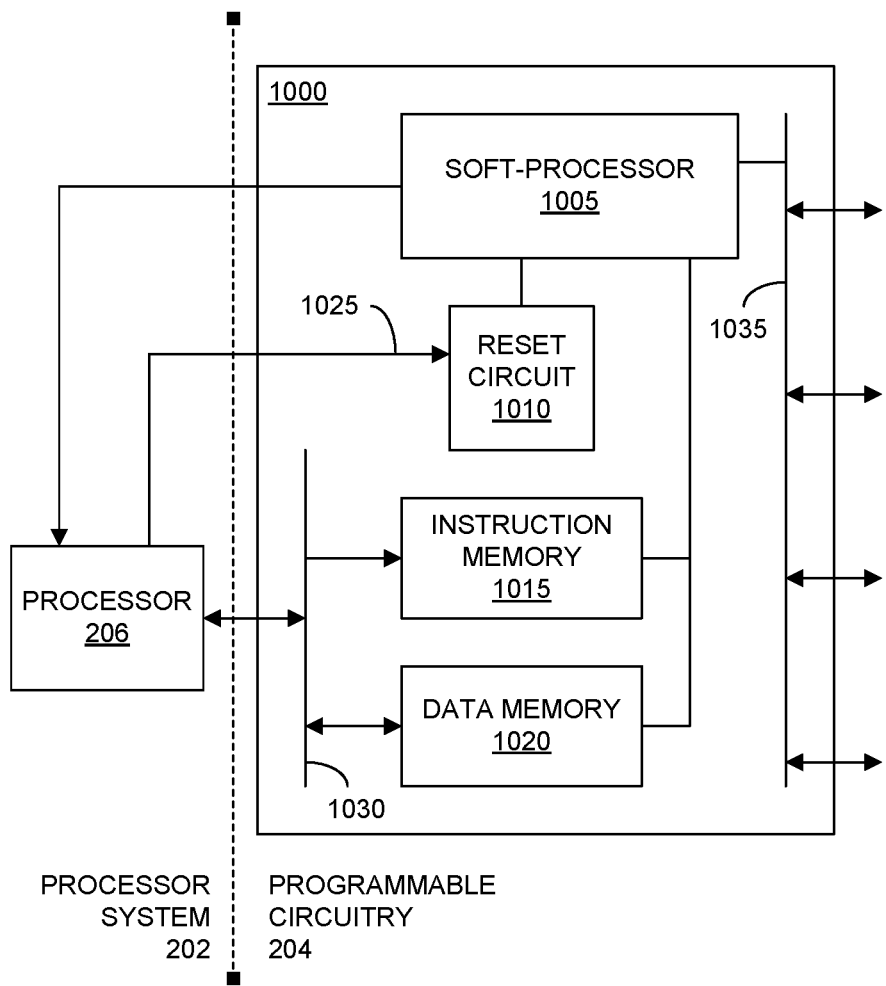
FIG. 10 is an example of a slave processor.

FIG. 10 is an example of a slave processor 1000. In one or more embodiments, slave processor 1000 is implemented entirely within programmable circuitry 204 of SOC 200. Further, slave processor 1100 is capable of operating entirely under control of processor 206. In the example of FIG. 10, slave processor 1000 includes a soft-processor 1005. Slave processor 1000 has a dual port design. The dual port design uses separate memories for data and instructions. In support of the dual port design, slave processor 1000 includes an instruction memory 1015 and a data memory 1020. In particular embodiments, instruction memory 1015 and data memory 1020 are implemented using BRAMs of the programmable circuitry 204. Further, slave processor 1000 can include an optional reset circuit 1010.

In one or more embodiments, slave processor 1000 is coupled to processor 206 via one or more control signals 1025 and an interface 1030. In particular embodiments, control signals 1025 are conveyed from processor 206 as a GPIO interface. In particular embodiments, interface 1030 is implemented as an AXI interface. Slave processor 1000 further can include an interface 1035 that is capable of coupling soft-processor 1005 to other circuitry implemented in programmable circuitry 204. In particular embodiments, interface 1035 is implemented as an AXI interface. Through interface 1035, slave processor 1000 appears as a master to other circuits connected to slave processor 1000.

Processor 206 is capable of providing, e.g., writing, instructions to instruction memory 1015 via interface 1030. In particular embodiments, instructions written to instruction memory 1015 can include read-only data such as tables or other suitable data. Processor 206 is capable of providing, e.g., writing, data to data memory 1020 via interface 1030. Soft-processor 1005 is capable of accessing or reading instructions from instruction memory 1015 and data from data memory 1020. Soft-processor 1005 is capable of executing the instructions retrieved from instruction memory 1015 and operating on data retrieved from data memory 1020. Soft-processor 1005 is capable of writing results to data memory 1020 from execution. As such, processor 206 is also capable of reading data, e.g., results, from data memory 1020.

In one or more embodiments, soft-processor 1005 includes an interrupt port that can be coupled to circuitry implemented in programmable circuitry 204. Circuitry implemented in programmable circuitry 204 is capable of exercising the interrupt port of soft-processor 1005.

In one or more embodiments, slave processor 1000 is implemented as an overlay or as part of an overlay. Accordingly, an HPL API for the overlay circuit that implements slave processor 1000 is available to processor 206 for use and inclusion in an application. Using the HPL API, processor 206 is capable of controlling operation of slave processor 1000. Processor 206, in executing framework 304, is capable of controlling slave processor 1000.

As noted, reset circuit 1010 is optionally included in slave processor 1000. Reset circuit 1010 is capable of receiving one or more signals and exercising the reset function of soft-processor 1005 in response to detecting a particular condition or conditions on the signals received. In one or more embodiments, reset circuit 1010 is capable of generating a non-maskable interrupt (NMI). The NMI may be a state control that is handled by soft-processor 1005. For example, reset circuit 1010 is capable of restarting soft-processor 1005 to restart executing same instructions (e.g., program code) from instruction memory, resetting soft-processor 1005, holding soft-processor 1005 in reset, or providing other interrupts that are handled differently by soft-processor 1005 based upon the type of interrupt received. In one or more embodiments, processor 206 is coupled directly to an interrupt port of soft-processor 1005 (e.g., where reset circuit 1010 is not included in slave processor 1000).

Using control signals 1025 and interface 1030, processor 206 is capable of controlling operation of slave processor 1000. Processor 206 is capable of behaving as a master to slave processor 1000. As an illustrative and non-limiting example, processor 206 is capable of starting, stopping, and resetting slave processor 1000 at any time. Processor 206 is capable of determining the program code to be executed by soft-processor 1005 and loading such program code into instruction memory 1015 during runtime, e.g., in real-time, as applied to processor 206. Processor 206 further is capable of proving any data to be operated upon by soft-processor 1005 and loading such data into data memory 1020 during runtime, e.g., in real-time, as applied to both processor 206 and soft-processor 1005.

As such, processor 206 is capable of performing runtime customization of slave processor 1000. Processor 206 can allow slave processor 1000 to operate. At some point, processor 206 is capable of halting operation of slave processor 1000, e.g., via reset circuit 1010, loading different or new instructions into instruction memory 1015 and/or different or new data into data memory 1020. Processor 206 is capable of resetting and/or restarting (e.g., releasing soft-processor from the halt) operation of soft-processor 1005 to begin executing the new instructions and/or to begin processing the new data. In particular embodiments, processor 206 is capable of writing to data memory 1020 without halting operation of soft-processor 1005. Processor 206, in acting as the master, is capable of exchanging instructions and/or data with soft-processor 1005 via instruction memory 1015 and data memory 1020.

In one or more embodiments, data memory 1020 includes a region or portion of memory that is reserved for use by processor 206. The region, e.g., a command mailbox, can be written by processor 206 and is read-only for soft-processor 1005. The region is reserved for receiving command(s) from processor 206. This allows processor 206 to issue commands to soft-processor 1005 without having to halt operation of soft-processor 1005. In general, processor 206 is capable of causing soft-processor 1005 to behave differently by writing one or more commands to the command mailbox within data memory 1020.

As an illustrative and non-limiting example, soft-processor 1005 may be configured to process data such as data obtained from a temperature sensor. In an aspect, a memory address or addresses within the command mailbox of instruction memory 1015 can be reserved for receiving a command from processor 206 that dictates whether soft-processor 1005 returns results formatted in Celsius, in Fahrenheit, or both. Thus, processor 206 is capable of writing a command to the address or addresses within the command mailbox to control operation of soft-processor 1005 during runtime of soft-processor 1005, e.g., without first halting operation of soft-processor 1005. In another example, processor 206 can write read-only data, e.g., a data table, within the command mailbox. Soft-processor 1005, for example, can then read and utilize the data written therein.

In one or more embodiments, processor 206 is capable of executing an HPL library (e.g., a library accessed via the HPL API for the overlay circuit implementing slave processor 1000). The library provides standardized interfaces to one or more instances of slave processor 1000 that may be implemented within programmable circuitry 204 as an overlay circuit.

The instructions provided from processor 206 to instruction memory 1015 can originate from one or more different sources. In particular embodiments, processor 206 is capable of providing precompiled binaries to instruction memory 1015. The precompiled binaries may be provided to processor 206 at boot time (of processor 206). For example, one or more precompiled binaries may be included within framework 304. In an aspect, the precompiled binary of a given slave processor is stored in the overlay for the slave processor, e.g., as part of the bitstream. In another aspect, one or more precompiled binaries for the overlay can be part of the overlay software for the overlay and can be specified separately from the overlay.

In particular embodiments, processor 206 is capable of cross-compiling source code at runtime using one or more of compilers 310 and providing the resulting binary to instruction memory 1015 at runtime of processor 206 and of slave processor 1000. In particular embodiments, processor 206 is capable of linking one or more precompiled modules at runtime of processor 206 and providing the resulting linked modules to instruction memory 1015 at runtime of slave processor 1000. In one or more other embodiments, processor 206 is capable of receiving precompiled binaries, source code, and/or combinations thereof from a remote system, processing the received instructions, and providing the resulting instructions, e.g., as a binary, to instruction memory 1015.

In one or more embodiments, slave processor 1000 is capable of generating or raising an interrupt on processor 206. In particular embodiments, soft-processor 1005 is capable of raising an interrupt on processor 206 via interface 1030 (not shown). In particular embodiments, soft-processor 1005 may be implemented with a direct connection to interrupt port of processor 206 to raise an interrupt on processor 206. In one or more embodiments, the interrupt mechanisms used by slave processor 1000 and processor 206 are integrated within an asynchronous event loop implemented in an HPL executed by processor 206 to support high-level nonblocking I/O.

In particular embodiments, slave processor 1000 is granted read and write access to a reserved area of on-chip memory or external memory, e.g., memory 105, in an address map of processor 206. Using such a configuration, processor 206 is capable of exchanging data with one or more different slave processors 1000 without direct involvement of processor 206. For example, processor 206 is able to write data to an area of memory corresponding to a particular slave processor 1000. Responsive to a signal from processor 206 indicating that data and/or instructions are ready, slave processor 1000 is capable of retrieving the instructions and/or data from the reserved area of memory.

As an illustrative and non-limiting example, slave processor 1000 can be configured to take a measurement periodically, e.g., every 10 milliseconds. In response to each measurement, slave processor 1000 is capable of determining whether the measurement is within a predetermined range. Further, slave processor 1000 is capable of logging the last "N" measurements, e.g., in data memory 1020. In this example, "N" is a predetermined integer value.

Slave processor 1000 is capable of evaluating the measurements. In response to determining that one or more measurements are out of range, slave processor 1000 is capable of taking an action. In one example, slave processor 1000 is capable of applying a function to the collected measurements such as taking a derivative of the measurements or the last "M" measurements, e.g., where "M" is an integer value and may be less than "N." If the derivative, or other calculation, is within the predetermined range, slave processor 1000 continues operating. If the value that is calculated is out of the predetermined range, slave processor 1000 is capable of raising an interrupt on processor 206. In this example, slave processor 1000 handles the processing and relieves processor 206 from overseeing the collection and evaluation of measurements until such time that an out of range condition is detected. Moreover, since processor 206 is executing operating system 302, e.g., a Linux operating system or other modern operating system, processor 206 may not be suitable for monitoring a real-time process as is the case with slave processor 1000 and, more particularly, soft-processor 1005.

Figure 11:
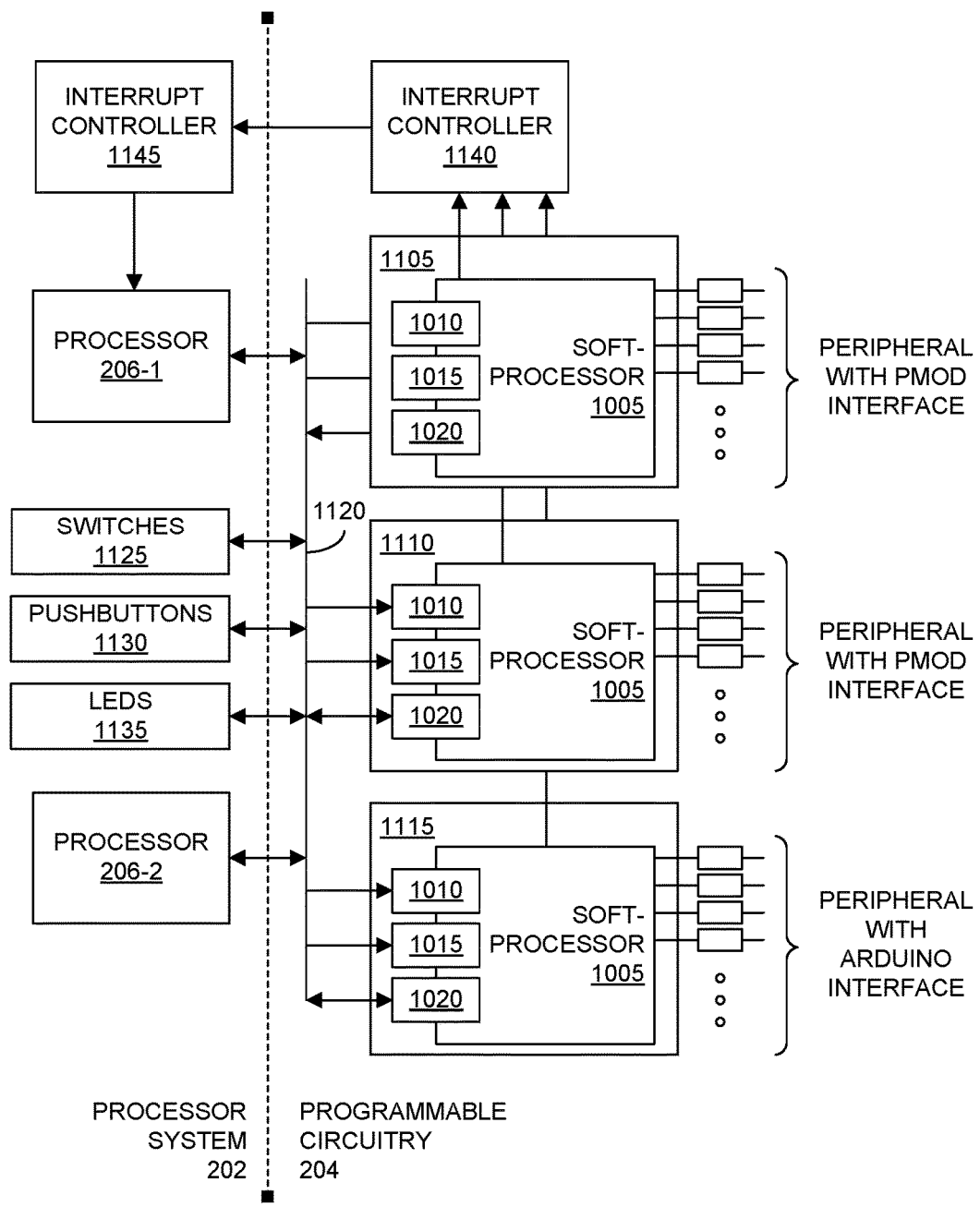
FIG. 11 is an example implementation of an SOC with two processors each operating as a master processor and including multiple instances of a slave processor.

FIG. 11 is an example implementation of SOC 200 with two processors each operating as a master processor and including multiple instances of slave processor 1000. In the example of FIG. 11, SOC 200 includes a first processor 206-1 and a second processor 206-2. Each of processors 206 operates as a master processor and is coupled to slave processors 1105, 1110, and 1115 via an interface 1120, e.g., a bus or an interconnect. One or more peripherals such as switches 1125, pushbuttons 1130, and LEDs 1135 (which may be coupled to productivity platform 100) may also be coupled to interface 1120. For ease of illustration, particular signals such as interrupts are not illustrated in FIG. 11.

In the example of FIG. 11, slave processor 1105 is coupled to a first peripheral device. The first peripheral device is external to SOC 200 and may be coupled via one or more I/O pins of SOC 200 through I/O interface 115. For purposes of illustration and not limitation, the first peripheral device coupled to slave processor 1105 has a PMOD compatible interface.

In the example of FIG. 11, slave processor 1110 is coupled to a second peripheral device. The second peripheral device is external to SOC 200 and may be coupled via one or more I/O pins of SOC 200 through I/O interface 115. For purposes of illustration and not limitation, the second peripheral device coupled to slave processor 1110 has a PMOD compatible interface.

In the example of FIG. 11, slave processor 1115 is coupled to a third peripheral device. The third peripheral device is external to SOC 200 and may be coupled via one or more I/O pins of SOC 200 through I/O interface 115. For purposes of illustration and not limitation, the third peripheral device coupled to slave processor 1115 has an Arduino compatible interface.

Each of slave processors 1105, 1110, and 1115 is controlled by one or both of processors 206. Each respective one of slave processors 1105, 1110, and 1115 can be controlled by processor 206-1 and/or processor 206-2 to control the internal data path, e.g., within programmable circuitry 204, for the respective peripheral device to which the slave processor is coupled. The hardware data path, for example, is capable of bridging or connecting a peripheral to processor 206 and/or to other circuits that may be implemented in programmable circuitry 204.

As an illustrative and non-limiting example, processor 206-1 is capable of programming slave processor 1105 with the correct I/O pin configuration to communicate with the peripheral device connected thereto. The configuration of slave processor 1105, e.g., a post-bitstream configuration as performed by processor 206-1, can be performed using the HPL API of the overlay including slave processors 1105, 1110, and 115. In one or more embodiments, the particular operations performed by processor 206-1 may be wrapped in the HPL.

Processor 206-1, for example, is capable of providing instructions to instruction memory 1015 of slave processor 1105. In executing the instructions, soft-processor 1005 of slave processor 1105 is capable of controlling the functionality of I/O pins coupled to the first peripheral device and/or repurposing such I/O pins to correctly communicate with the first peripheral device. Processor 206-1, for example, is capable of providing different instructions to slave processor 1105 for execution based upon the particular type of peripheral to which slave processor 1105 is connected. With the correct instructions, soft-processor 1005 is capable of correctly driving the interface with the first peripheral device. Processor 206-1 and/or processor 206-2 is capable of controlling slave processors 1110 and 1115 in the same or similar manner as described in connection with slave processor 1105.

In the example of FIG. 11, each different instance 1105, 1110, and 1115 of the slave processor can be customized by processor 206-1 and/or processor 206-2 to perform a particular task based upon the instructions and/or data provided to instruction memory 1015 and/or data memory 1020. As an illustrative and non-limiting example, one peripheral may be a display, another peripheral may be an audio subsystem, etc., where each slave processor is customized for the peripheral connected thereto.

The ability to perform post-bitstream configuration on a slave processor means that programmable circuitry 204 need not be reconfigured when changing the functionality of slave processor 1000 (or of other overlays). As an illustrative example, a slave processor can be reprogrammed to control a different peripheral that may be plugged into or connected to productivity platform 100. Without the ability to perform post-bitstream configuration, programmable circuitry 204 would need to be reconfigured by loading a new and different overlay therein. The inclusion of RCEs within an overlay facilitates the customization of that overlay without resorting to reconfiguring programmable circuitry 204 in each case whether wholly or through partial reconfiguration.

In the example of FIG. 11, each of soft processors 1005 is capable of generating an interrupt signal that is provided to an interrupt controller 1140. Interrupt controller 1140 is implemented in programmable circuitry 204. In one or more embodiments, interrupt controller 1140 is part of an overlay circuit including one or more slave processors such as slave processors 1105, 1110, and 1115. Interrupt controller 1140 is capable of providing an interrupt signal to interrupt controller 1145 in response to interrupt signals received from soft-processors 1005. Interrupt controller 1145 is implemented in PS 202 and, as such, is hardwired. Interrupt controller 1145 is coupled to an interrupt port of processor 206 and is capable of generating an interrupt on the interrupt port of processor 206 in response to receiving an interrupt signal from interrupt controller 1140. In the example of FIG. 11, interrupt controller 1145 is coupled to the interrupt port of processor 206-1. In another embodiment, interrupt controller 1145 is coupled to the interrupt port of each of processors 206-1 and 206-2.

In one or more embodiments, interrupt controller 1140 and interrupt controller 1145 can be implemented using an AXI interface as described herein. As such, interrupt controller 1140 may be implemented as a soft AXI interrupt controller and interrupt controller 1145 may be implemented as a hard AXI interrupt controller. The example interface type provided is for purposes of illustration and not limitation. Other interfaces may be used in place of AXI without limitation.

The interrupt controller architecture described in connection with FIG. 11 is an example of interrupt chaining. In particular embodiments, an interrupt controller architecture as illustrated in FIG. 11 may be used in cases where a single slave processor is implemented in programmable circuitry 204. In particular embodiments, an interrupt architecture as illustrated in FIG. 11 can be used where more than one slave processors are implemented in programmable circuitry 204. For example, the interrupt controller architecture shown including interrupt controller 1140 and interrupt controller 1145 can be incorporated into the examples illustrated herein in connection with FIGS. 10, 12, 13, and/or 14. The particular number of slave processors included in the example of FIG. 11 is not intended to be limiting. Fewer or more slave processors can be implemented in programmable circuitry 204 and/or included in an overlay.

Figure 12:
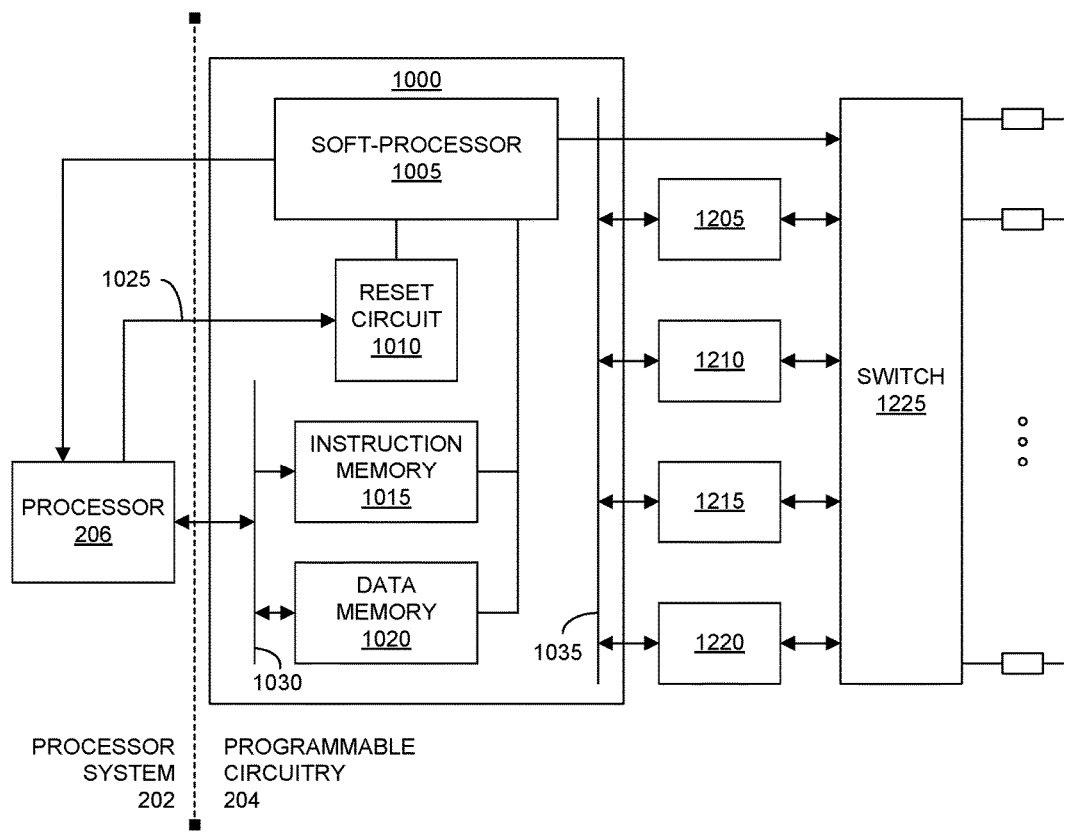
FIG. 12 illustrates another example implementation of a slave processor.

FIG. 12 illustrates another example implementation of slave processor 1000. In the example of FIG. 12, slave processor 1000 is coupled to a switch 1225. Interface 1035 is coupled to a plurality of different circuit blocks 1205, 1210, 1215, and 1220. Slave processor 1000, circuit blocks 1205-1220, and switch 1225 are implemented within programmable circuitry 204. In one or more embodiments, slave processor 1000, circuit blocks 1205-1220, and switch 1225 are part of an overlay.

Each of circuit blocks 1205-1220 is capable of implementing a different operation or performing a different task. One or more of circuit blocks 1205-1220, for example, is capable of communicating using a different communication protocol. For purposes of illustration and not-limitation, circuit block 1205 is capable of implementing a GPIO interface, circuit block 1210 is capable of implementing a I$^2$C interface, circuit block 1215 is capable of implementing an SPI interface, and circuit block 1220 is capable of implementing a timer.

In the example of FIG. 12, switch 1225 is controlled by soft-processor 1005. As discussed, slave processor 1000 is controlled by processor 206. Accordingly, switch 1225 is capable of coupling signals received on the right side (e.g., external signals received from a peripheral device) to one (or more) of circuit blocks 1205, 1210, or 1215 based upon the control signals provided from soft-processor 1005. In this manner, slave processor 1000 is capable of interfacing to any of a variety of peripheral devices using any of a variety of different protocols by coupling a selected circuit block (e.g., one or more of circuit blocks 1205-1215) to I/O pins of SOC 200 using switch 1225.

In one or more embodiments, soft-processor 1005 is capable of changing the particular circuit block 1205-1220 that is coupled to I/O pins of SOC 200 via switch 1225 during runtime, e.g., in real-time. For example, soft-processor 1005 is capable of executing program code and changing the particular circuit block(s) 1205-1220 connected to I/O pins of SOC 200 based upon current operating conditions and decisions made in executing program code. As discussed, since processor 206 is capable of controlling operation of soft-processor 1005, processor 206 is capable of controlling which of circuit blocks 1205-1220 is/are coupled to I/O pins through switch 1225 at least by virtue of providing different instructions to instruction memory 1015 and/or different data to data memory 1020.

In the example of FIG. 12, switch 1225 is described as being connected to I/O pins of SOC 200. In one or more other embodiments, switch 1225 can be connected to any signals available within programmable circuitry 204. For example, switch 1225 can be coupled to one or more signals of another circuit and/or system implemented within programmable circuitry 204 (e.g., another circuit within an overlay), to one or more signals of a partially reconfigurable region within programmable circuitry 204, to one or more I/O pins of SOC 200, or any combination thereof. Switch 1225 provides increased flexibility for connecting slave processor 1000 to any of a variety of signals and/or circuits of SOC 200 and/or to peripherals thereof.

Figure 13:
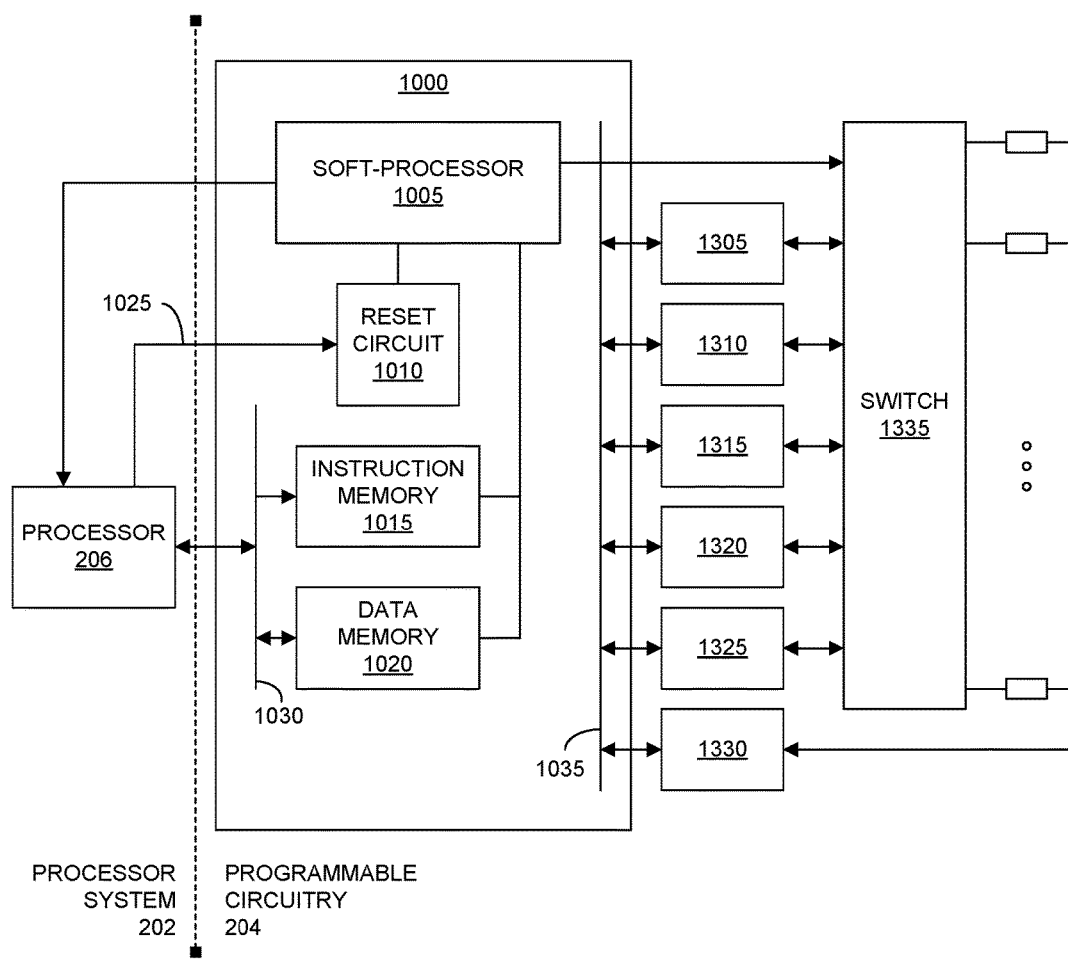
FIG. 13 illustrates another example implementation of a slave processor.

FIG. 13 illustrates another example implementation of slave processor 1000. In the example of FIG. 13, slave processor 1000 is coupled to a switch 1335. Interface 1035 is coupled to a plurality of different circuit blocks 1305, 1310, 1315, 1320, 1325, and 1330. Slave processor 1000, circuit blocks 1305-1330, and switch 1325 are implemented within programmable circuitry 204. In one or more embodiments, slave processor 1000, circuit blocks 1305-1330, and switch 1325 are part of an overlay.

Each of circuit blocks 1305-1330 is capable of implementing a different operation or performing a different task. One or more of circuit blocks 1305-1330, for example, is capable of communicating using a different communication protocol. For purposes of illustration and not-limitation, circuit block 1305 is capable of implementing a two GPIO interfaces, circuit block 1310 is capable of implementing two I²C interfaces, circuit block 1315 is capable of implementing two SPI interfaces, circuit block 1320 is capable of implementing a plurality of different timers (e.g., 6 timers), circuit block 1325 is capable of implementing a UART, and circuit block 1330 is capable of implementing an ADC.

In the example of FIG. 13, switch 1335 is controlled by soft-processor 1005. As discussed, slave processor 1000 is controlled by processor 206. Accordingly, switch 1335 is capable of coupling signals received on the right side (e.g., external signals received from a peripheral device) to one of circuit blocks 1305-1325 based upon the control signals provided from soft-processor 1005. In this manner, slave processor 1000 is capable of interfacing to any of a variety of peripheral devices using any of a variety of different protocols by coupling a selected circuit block (e.g., of circuit blocks 1305-1325) to I/O pins of the SOC using switch 1335.

Referring to FIGS. 12 and 13, processor 206 is capable of executing an HPL application and deciding, at runtime, which of the blocks (e.g., circuit blocks 1205-1220 or 1305-1325) to connect to which I/O pins on the right side of the switch. In general, the example implementations of FIGS. 12 and 13 provide flexibility to route signals from any of such blocks to any I/O pin at runtime.

The various examples of providing instructions to slave processor 1000, providing data to slave processor 1000, and/or controlling switch 1225 and/or 1325 are examples of post-bitstream configuration for an overlay that includes a soft-processor. In another example, a peripheral connected to switch 1225 and/or switch 1335 is capable of providing an identifier that uniquely identifies the peripheral. In that case, soft-processor 1005 is capable of controlling the switch to connect the appropriate one of the circuit blocks to the I/O pins to communicate with the peripheral based upon the identifier that is received, e.g., the value.

In the example of FIG. 13, switch 1335 is described as being connected to I/O pins of SOC 200. In one or more other embodiments, switch 1335 can be connected to any signals available within programmable circuitry 204. For example, switch 1335 can be coupled to one or more signals of another circuit and/or system implemented within programmable circuitry 204 (e.g., another circuit within an overlay), to one or more signals of a partially reconfigurable region within programmable circuitry 204, to one or more I/O pins of SOC 200, or any combination thereof. Switch 1335 provides increased flexibility for connecting slave processor 1000 to any of a variety of signals and/or circuits of SOC 200 and/or to peripherals thereof.

Figure 14:
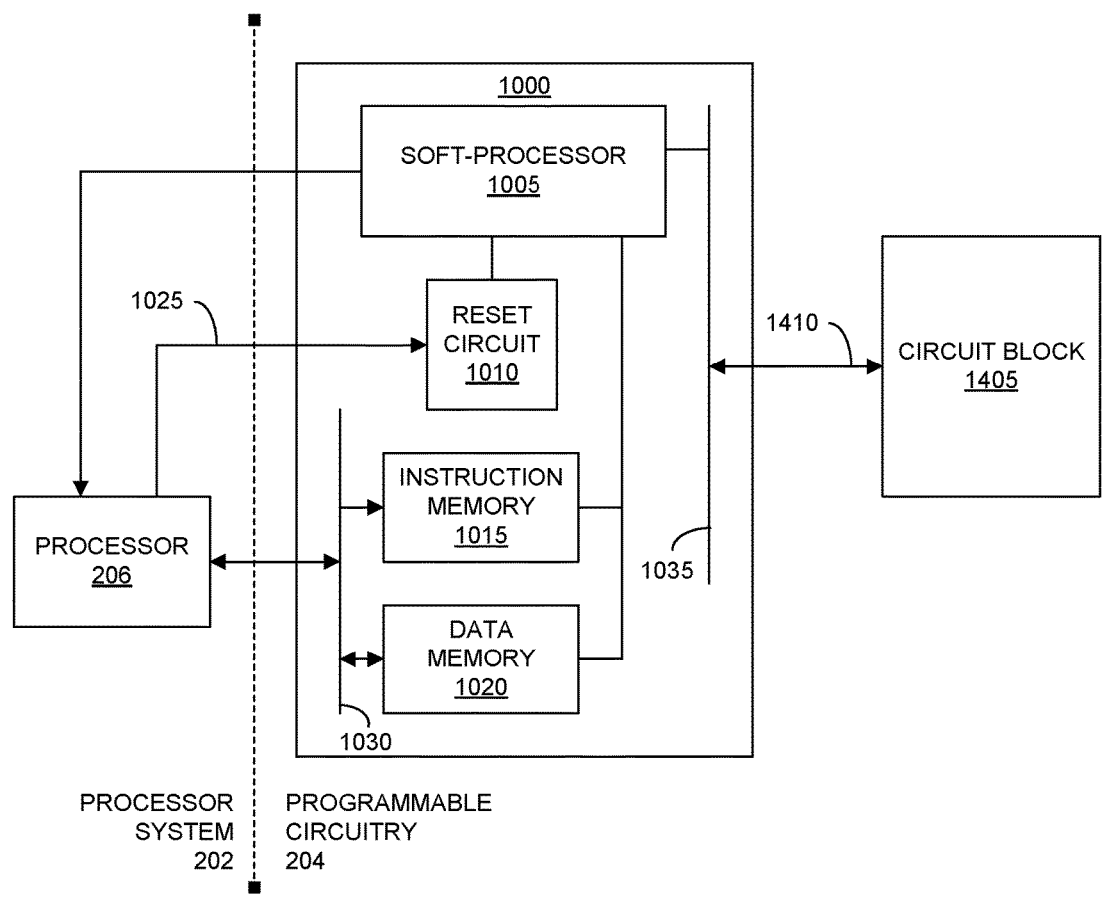
FIG. 14 illustrates another example implementation of a slave processor.

FIG. 14 illustrates another example implementation of slave processor 1000. In the example of FIG. 14, slave processor 1000 is coupled to a circuit block 1405. Circuit block 1405 can be a hardware accelerator or any type of circuit block (e.g., a core) that can be controlled by a controller as implemented by slave processor 1000. Slave processor 1000 is capable of controlling operation of circuit block 1405 via signals 1410.

As discussed, slave processor 1000 is controlled by processor 206. Accordingly, processor 206 is capable of customizing slave processor 1000 to control operation of circuit block 1405. As an illustrative and non-limiting example, slave processor 1000 is capable of creating a hardware data path around circuit block 1405. In one or more embodiments, slave processor 1000 is capable of connecting circuit block 1405 to processor 206 and/or to other circuits that may be implemented in programmable circuitry 204. Processor 206 is capable of starting one or more of slave processors 1000 where each provides a hardware data path around a circuit block such as circuit block 1405 to perform a given task.

In one or more embodiments, slave processor 1000 is capable of configuring circuit block 1405. For example, circuit block 1405 may including one or more control or configuration registers. Soft-processor 1005 is capable of writing to these registers. Soft-processor 1005, for example, is provided with the instructions and/or data necessary to communicate with circuit block 1405 and configure circuit block 1405 as may be required and/or to update circuit block 1405 in during operation. As an illustrative and non-limiting example, circuit block 1405 may implement a programmable filter. Soft-processor 1005 is capable of writing to the registers of circuit block 1405 to implement particular filter operations and subsequently write to the registers of circuit block 1405 again to implement different filter operations.

In one or more embodiments, slave processor 1000 is capable of performing tasks or operations that have been offloaded from processor 206. As an illustrative and non-limiting example, processor 206 is capable of selecting a particular operation or calculation for offloading to slave processor 1000. Processor 206 is capable of providing the instructions and/or data necessary to instruction memory 1015 and/or data memory 1020 for slave processor 1000 as described herein to perform the calculation. Slave processor 1000 returns the results to processor 206 thereby freeing processor 206 to perform other operations. In one or more embodiments, processor 206 is capable of compiling program code to generate instructions for soft-processor 1005 and writing such instructions to instruction memory 1015. Still, as discussed herein, instructions provided to soft-processor 1005 by processor 206 can originate from any of a variety of different sources.

Figure 15:
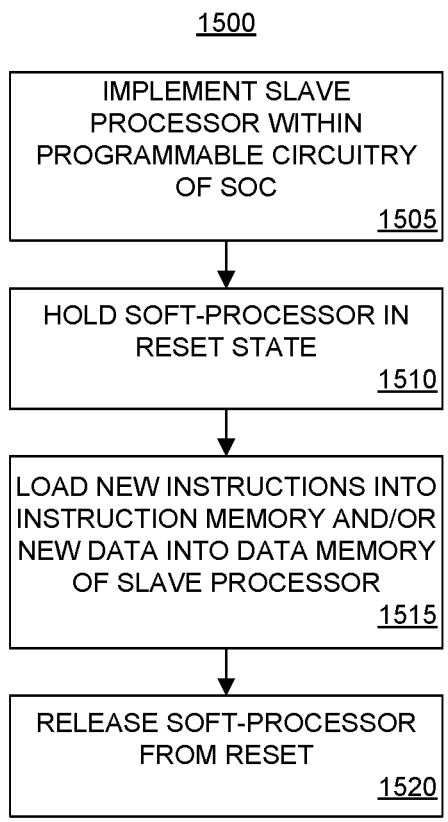
FIG. 15 illustrates an example method of using a slave processor.

FIG. 15 illustrates an example method 1500 of using a slave processor. FIG. 15 can be performed by processor 206 of SOC 200. In block 1505, processor 206 is capable of implementing slave processor 1000 within programmable circuitry 204 of SOC 200. In one or more embodiments, slave processor 1000 is implemented by loading a bitstream under control of processor 206, wherein the bitstream specifies slave processor 1000. In particular embodiments, slave processor 1000 is part of an overlay that is implemented within programmable circuitry 204 by processor 206. The bitstream or overlay, as the case may be, may be loaded by processor 206 through execution of an HPL library.

In block 1510, processor 206 is capable of holding soft-processor 1005 in a reset state. For example, processor 206 is capable of providing control signals 1025 to reset circuit 1010. Reset circuit 1010 is capable of interpreting control signal 1025 and providing the necessary signal(s) to soft-processor 1005 to hold soft-processor 1005 in the reset state. In one or more embodiments where reset circuit 1010 is not included in slave processor 1000, processor 206 is capable of providing control signals 1025 directly to soft-processor 1005. While held in the reset state, soft-processor 1005 is unable to execute any instructions or operate on data. In effect, slave processor 1000 is idle while soft-processor 1005 is held in the reset state.

In block 1515, processor 206 is capable of loading new instructions into instruction memory 1015 of slave processor 1000. In addition, or in the alternative, processor 206 is capable of loading new data into data memory 1020 of slave processor 1000. In block 1520, processor 206 is capable of releasing soft-processor 1005 from reset. Accordingly, in response to being released from reset, soft-processor 1005 is capable of starting execution of the new instructions and/or operating on the new data.

Figure 16:
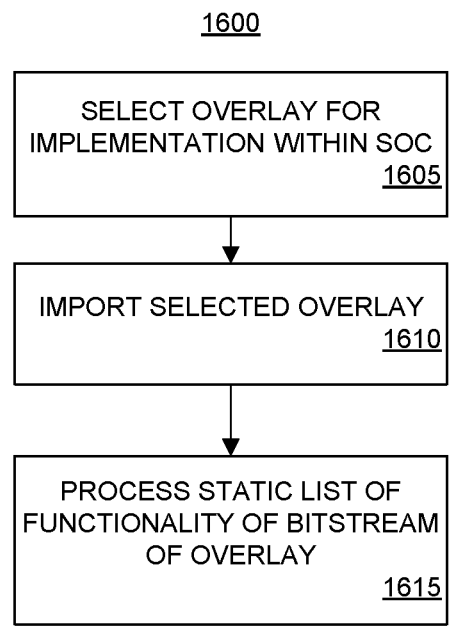
FIG. 16 illustrates an example method of implementing overlays.

FIG. 16 illustrates an example method 1600 of implementing overlays. Method 1600 can be performed by an SOC such as SOC 200 of FIGS. 1 and 2. Method 1600 can begin in a state where processor 206 is executing an application. The application can be implemented in an HPL.

In block 1605, processor 206 selects an overlay for implementation within SOC 200. As an illustrative and non-limiting example, the overlay may be configured for performing pattern checking or image processing. The overlay to be implemented is determined through execution of the application, e.g., processor 206 selects the overlay by executing the application.

In one or more embodiments, processor 206 is capable of downloading an overlay from one or more sources 145. Processor 206 is capable of downloading the selected overlay and installing the overlay within productivity platform 100. For example, processor 206 is capable of performing a pip install of the overlay in the case wherein the high-productivity language is Python. Processor 206 is capable of setting up the files of the overlay, e.g., any overlay software such as HPL libraries, the HPL API for the overlay, metadata describing the overlay, in correct directories and/or locations in memory 110. Processor 206 is further capable of updating the HPL (e.g., Python) paths for the installed libraries for HPL kernel 308 and/or for server-based IDE 306 and/or for other components of framework 304.

In one or more embodiments, processor 206 is capable of accessing an overlay that is already stored and available in memory 110.

In block 1610, processor 206 is capable of importing the selected overlay. In response to importing the selected overlay, processor 206 is capable of loading overlay into configuration memory cells thereby physically implementing the circuit design specified by the overlay within programmable circuitry 204 of SOC 200. The overlay is loaded using a function implemented in the HPL language. In one or more embodiments, the function is implemented in an ELL such as C/C++ and is wrapped in the HPL. The HPL function, when executed, delivers the overlay to the appropriate internal port of SOC 200 for loading the bitstream into configuration memory cells. For example, the HPL function can deliver the overlay to the PCAP or the ICAP of SOC 200.

In block 1615, processor 206 optionally processes a static list of functionality of the bitstream of the overlay. In one or more embodiments, the static list is, or is part of, the metadata portion of the overlay software for the overlay. In an example, the static list is specified as a JSON formatted file, e.g., as a JSON table. In another example, the static list is specified as a TCL file or files. The JSON file and the TCL file are examples of metadata that can be stored as part of an overlay.

In particular embodiments, processor 206 is capable of parsing the static list of functionality, e.g., the metadata, of the bitstream. From the static list, processor 206, for example, is capable of determining the particular IPs (e.g., cores) included in the overlay. In the case where the bitstream specifies a soft-processor, e.g., a slave processor 1000, the static list can specify the memory map of the soft-processor thereby allowing processor 206 to interact with the soft-processor. For example, the memory map indicates the addresses for the instruction memory and/or the data memory of the slave processor for use by processor 206. In another example, processor 206, is capable of parsing the static list and checking that correct drivers are available in the library for processor 206 to interact with the overlay.

As an illustrative and non-limiting example, the metadata can specify the number of slave processors 1000 included in the overlay (e.g., number of each different core included in the overlay) and the addresses where each of the slave processors 1000 (e.g., cores) is located. Accordingly, processor 206, in response to parsing the metadata, is capable of customizing drivers for each slave processor 1000 at runtime for the particular bitstream of the overlay that is being implemented. Each driver, for example, can be customized with the specific address of the slave processor with which processor 206 is to communicate.

In one or more embodiments, the overlay that is initially implemented in SOC 200 can be an overlay configured for performing self-test. The overlay circuit implemented in programmable circuitry 204 can indicate the status of the self-test, e.g., pass, fail, or a different state. In response to the value returned by the overlay circuit performing self-test, processor 206 is capable of selecting a different overlay for implementation in SOC 200 based upon the particular value that is returned. In such an example, processor 206 is selecting and dynamically implementing a particular overlay based upon a parameter determined at runtime.

Figure 17:
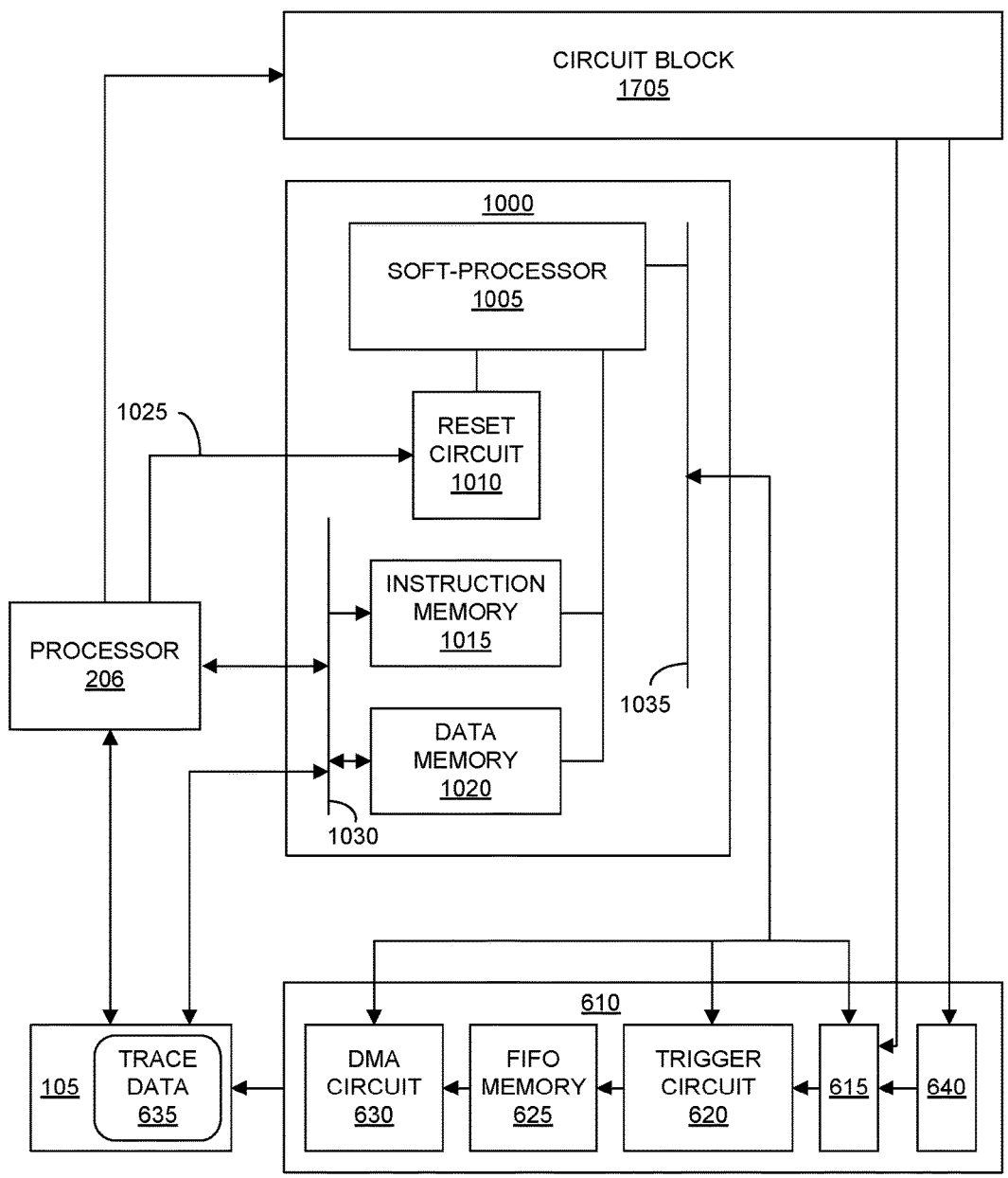
FIG. 17 illustrates an example implementation of an SOC including probe capabilities and a soft-processor.

FIG. 17 illustrates an example implementation of an SOC including probe capabilities and a soft-processor. In the example of FIG. 17, an overlay includes a slave processor 1000, a trace buffer 610, and a circuit block 1705. Memory 105 is located off-chip of SOC 200. Processor 206 is included in the PS 202. Circuit block 1705, slave processor 1000, and trace buffer 610, being part of an overlay, are implemented in programmable circuitry 204.

In the example of FIG. 17, slave processor 1000 is tasked with controlling operation of trace buffer 610. For example, processor 206 has offloaded functions as described herein relating to control of trace buffer 610 and analysis of trace data 635 to slave processor 1000.

Trace buffer 610 is capable of probing one or more signals of circuit block 1705. Allocation of the portion of memory 105 can be performed by processor 206 and/or by slave processor 1000 under control of processor 206. In the example shown, slave processor 1000 is capable of accessing memory 105. For example, slave processor 1000 is capable of accessing another port of memory controller 210 (not shown). As such, slave processor 1000 is capable of performing functions relating to the analysis of trace data 635 that otherwise may be performed by processor 206.

As an illustrative and non-limiting example, slave processor 1000 is capable of starting and stopping trace buffer 610 and performing the other functions relating to control of trace buffer 610 described in connection with processor 206.

In response to slave processor 1000 detecting a particular condition within trace data 635, slave processor 1000 is capable of triggering an interrupt of processor 206. In response to the interrupt, processor 206 can take further action.

The overlay circuit of FIG. 17 also illustrates another capability that can be incorporated into slave processor 1000 and/or a soft-processor implemented in programmable circuitry 204. Slave processor 1000 (or a soft-processor) is capable of accessing memory 105, which is also utilized by processor 206 as runtime program execution memory. As such, processor 206 and slave processor 1000 are capable of exchanging data using instruction memory 1015 and/or data memory 1020, but also through memory 105.

In one or more embodiments, soft-processor 105 is capable of accessing memory 105 in a same or similar manner as described in connection with DMA circuit 630 of trace buffer 610. Accessing memory 105 involves crossing from a physical address memory domain to an MMU managed virtual memory domain. Accordingly, processor 206 is capable of allocating a region of memory 105 that may be accessed and used (e.g., read and/or written) by soft-processor 1005. Processor 206 is capable of providing a pointer to the region in memory 105 to soft-processor 1005 via data memory 1020. Soft-processor 1005, with the pointer, is capable of accessing the region of memory 105. As an illustrative and non-limiting example, soft-processor 1005 is capable of accessing trace data 635 using this technique. In particular embodiments, soft-processor 1005 is coupled to memory controller 210 (not shown) to access memory 105. In particular embodiments, soft-processor 1005 is capable of accessing a DMA circuit block that may be implemented in the overlay in programmable circuitry 204 and/or a DMA circuit block implemented in PS 202 The DMA circuit block can be coupled to memory controller 210.

In particular embodiments, soft-processor 1005 includes one or more interrupt ports as described. The interrupt port may be coupled to other circuitry implemented within the overlay circuit and/or implemented within programmable circuitry 204. Such circuitry is capable of generating an interrupt to soft-processor 1005. As an illustrative and non-limiting example, circuitry implemented in programmable circuitry 204 is coupled to reset circuit 1010 (e.g., with signals 1025 or without signal 1025 being provided to reset circuit 1010) or is coupled directly to the reset port of soft-processor 1005. Soft-processor 1005 is capable of responding to the interrupt and taking further action. For example, soft-processor 1005 is capable of responding by implementing one or more interrupt routines which may or may not include generating an interrupt to processor 206.

Within this disclosure, examples are provided where an overlay is implemented in programmable circuitry 204 to implement an overlay circuit. In one or more embodiments, two or more overlays may be implemented concurrently within programmable circuitry 204. For example, each different overlay may be implemented in a different region of programmable circuitry. Further, overlay circuits may be configured to communicate with processor 206 and with one another when implemented in programmable circuitry 204. As discussed, processor 206 is capable of controlling overlay implementation in programmable circuitry 204 via framework 304 whether one or more overlays are implemented concurrently.

In one or more embodiments, programmable circuitry of SOC 200 may be implemented as field programmable gate array (FPGA) circuitry that may be programmed to perform specified functions. FPGA type programmable circuitry typically includes an array of programmable tiles. These programmable tiles may include, for example, input/output blocks (IOBs), configurable logic blocks (CLBs), dedicated BRAMs, multipliers, digital signal processing blocks (DSPs), processors, clock managers, delay lock loops (DLLs), and so forth.

Another type of programmable circuitry includes circuitry found in complex programmable logic device, or CPLDs. CPLD type of programmable circuitry includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Figure 18:
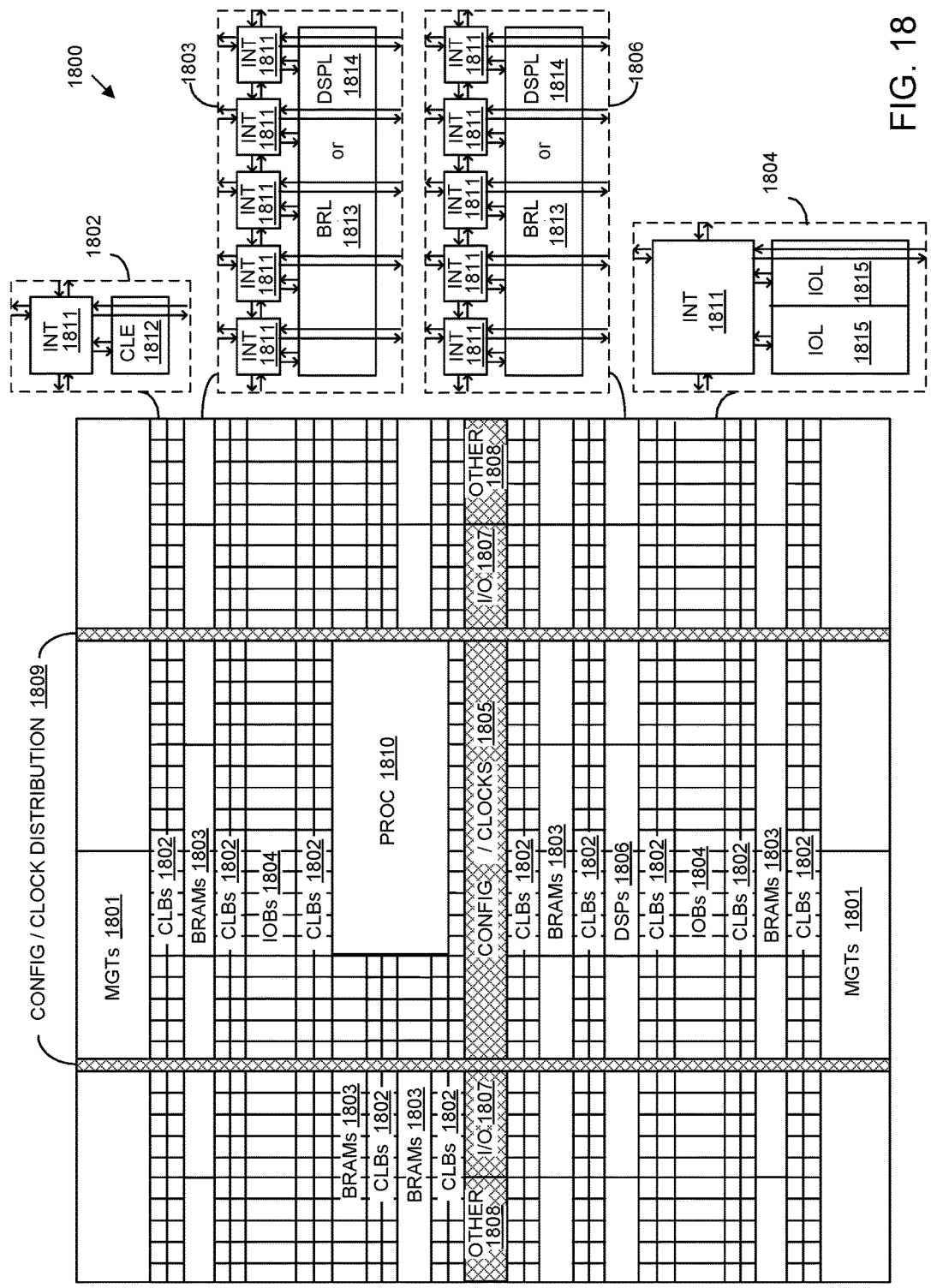
FIG. 18 illustrates another example architecture for an SOC type of IC.

FIG. 18 illustrates another example architecture 1800 for an IC. In one aspect, architecture 1800 may be implemented within a programmable IC. For example, architecture 1800 may be used to implement a field programmable gate array (FPGA). Architecture 1800 is also representative of an SOC type of IC. As discussed, an SOC is an IC that includes a processor that executes program code and one or more other circuits. The other circuits may be implemented as hard-wired circuitry, programmable circuitry, and/or a combination thereof. The circuits may operate cooperatively with one another and/or with the processor.

As shown, architecture 1800 includes several different types of programmable circuit, e.g., logic, blocks. For example, architecture 1800 may include a large number of different programmable tiles including multi-gigabit transceivers (MGTs) 1801, CLBs 1802, BRAMs 1803, IOBs 1804, configuration and clocking logic (CONFIG/CLOCKS) 1805, DSPs 1806, specialized I/O blocks 1807 (e.g., configuration ports and clock ports), and other programmable logic 1808 such as digital clock managers, ADCs, system monitoring logic, and so forth.

In some ICs, each programmable tile includes a programmable interconnect element (INT) 1811 having standardized connections to and from a corresponding INT 1811 in each adjacent tile. Therefore, INTs 1811, taken together, implement the programmable interconnect structure for the illustrated IC. Each INT 1811 also includes the connections to and from the programmable logic element within the same tile, as shown by the examples included at the top of FIG. 18.

For example, a CLB 1802 may include a configurable logic element (CLE) 1812 that may be programmed to implement user logic plus a single INT 1811. A BRAM 1803 may include a BRAM logic element (BRL) 1813 in addition to one or more INTs 1811. Typically, the number of INTs 1811 included in a tile depends on the height of the tile. As pictured, a BRAM tile has the same height as five CLBs, but other numbers (e.g., four) also may be used. A DSP 1806 may include a DSP logic element (DSPL) 1814 in addition to an appropriate number of INTs 1811. An 10B 1804 may include, for example, two instances of an I/O logic element (IOL) 1815 in addition to one instance of an INT 1811. The actual I/O pads connected to IOL 1815 may not be confined to the area of IOL 1815.

In the example pictured in FIG. 18, a columnar area near the center of the die, e.g., formed of regions 1805, 1807, and 1808, may be used for configuration, clock, and other control logic. Horizontal areas 1809 extending from this column may be used to distribute the clocks and configuration signals across the breadth of the programmable IC.

Some ICs utilizing the architecture illustrated in FIG. 18 include additional logic blocks that disrupt the regular columnar structure making up a large part of the IC. The additional logic blocks may be programmable blocks and/or dedicated circuitry. For example, a processor block depicted as PROC 1810 spans several columns of CLBs and BRAMs.

In one aspect, PROC 1810 may be implemented as dedicated circuitry, e.g., as a hardwired processor, that is fabricated as part of the die that implements the programmable circuitry of the IC. PROC 1810 may represent any of a variety of different processor types and/or systems ranging in complexity from an individual processor, e.g., a single core capable of executing program code, to an entire processor system having one or more cores, modules, co-processors, interfaces, or the like. The various circuit blocks described can be utilized to form a "soft processor" in that the various blocks of programmable circuitry may be used to form a processor that can execute program code as is the case with PROC 1810. One or more soft-processors may be implemented in combination with PROC 1810.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 18 that are external to PROC 1810 such as CLBs 1802 and BRAMs 1803 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream," "bitstream," and/or "overlay." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1810.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

FIG. 18 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 18 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1810 within the IC are for purposes of illustration only and are not intended as limitations.

In one or more embodiments, a productivity platform includes an SOC. The SOC can include programmable circuitry capable of implementing one or more overlay circuits specified by overlays. The SOC further can include a processor that is coupled to the programmable circuitry. The productivity platform can include a first memory that is capable of operating as a program execution memory and a second memory capable of storing an operating system and a framework. The processor of the SOC is capable of executing the operating system and the framework.

In particular embodiments, the framework is executable by the processor to perform overlay lifecycle management. The framework, for example, provides one or more HPL libraries of functions for performing overlay lifecycle management. Using the framework, the processor is capable of performing operations including, but not limited to, controlling one or more overlay circuits, performing post-bitstream configuration of overlay circuits, initializing overlay circuits, executing overlays (e.g., loading overlays to implement overlay circuits in programmable circuitry), interfacing with the circuits, halting or stopping overlay circuits, and/or removing overlay circuits from programmable circuitry. These various functions can be performed by the processor in executing functions of one or more of the HPL libraries of the framework.

The SOC is capable of providing a self-hosted framework in that the processor of the SOC is capable of executing the framework to operate as a server and provide a browser enabled interface to one or more external and separate (e.g., remote) data processing systems.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the term "high level programming language" (HLL) means a programming language, or set of instructions, used to program a data processing system where the instructions have a strong abstraction from the details of the data processing system, e.g., machine language. For example, a high level programming language may automate or hide aspects of operation of the data processing system such as memory management. Though referred to as "high level programming languages," these languages are typically classified as "efficiency-level languages" or "ELLs." ELLs expose hardware-supported programing models directly. Examples of high level programming languages include, but are not limited to, C, C++, and other suitable languages. An program written in an ELL is able to achieve multiple orders of magnitude higher performance than a high-productivity languages particularly on emerging parallel hardware.

A high-productivity language (HPL) is a higher level programming language than the aforementioned HLLs of the ELL variety. Characteristics of an HPL include, but are not limited to, being implemented as a scripting language. In another example, an HPL can be implemented as an extension language. HPLs are characterized by a domain-specific (e.g., subject matter) implementation. HPLs provide abstractions that are suited or well-matched to the particular domain of that HPL. HPLs focus on programmer productivity as opposed to hardware efficiency. HPLs may provide utilities for debugging and visualization that are useful for domain experts, but lack support for taking advantage of lower level hardware functions such as parallel processing in systems. Examples of an HPL include, but are not limited to, Python, Scala, and R.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, is an example of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically in consequence of the action or event. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to display or other peripheral output device, sending or transmitting to another system, exporting, or the like.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real-time" means a level of processing responsiveness that a user or system senses as sufficiently immediate for a particular process or determination to be made, or that enables the processor to keep up with some external process.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to an integrated circuit (IC). In one aspect, an IC can include programmable circuitry configured to implement an overlay circuit specified by an overlay. The IC can also include a processor coupled to the programmable circuitry and configured to control the programmable circuitry through execution of a framework, wherein the framework provides HPL control of implementation of the overlay in the programmable circuitry.

In an aspect, the overlay circuit is configured to perform a hardware operation and the framework provides a HPL library for controlling the hardware operation of the overlay circuit.

In another aspect, the overlay has a HPL application programming interface for accessing the hardware operation of the overlay circuit.

In another aspect, the processor, in executing the framework is self-hosting.

In another aspect, the processor is configured to execute the framework to provide a browser-enabled interface to a data processing system.

In another aspect, the IC is included in a productivity platform. The productivity platform can include a RAM coupled to the IC and configured as program execution memory for the processor, a bulk storage memory coupled to the processor and configured to store an operating system and the framework, and an I/O interface coupled to the IC.

In another aspect, the framework includes a server-based IDE executable by the processor for developing an application in the HPL.

In another aspect, the processor is configured to perform post-bitstream configuration of the overlay circuit once implemented within the programmable circuitry.

In another aspect, the overlay include at least one RCE.

In another aspect, the processor is configured to execute an overlay application.

One or more embodiments are directed to a method. In an aspect, a method can include providing programmable circuitry within an IC configured to implement an overlay circuit specified by an overlay. The method can also include providing a processor within the IC coupled to the programmable circuitry and configured to control the programmable circuitry through execution of a framework, wherein the framework provides HPL control of implementation of the overlay in the programmable circuitry.

In an aspect, the overlay circuit is configured to perform a hardware operation and the framework provides a HPL library for controlling the hardware operation of the overlay circuit.

In another aspect, the overlay has a HPL application programming interface for accessing the hardware operation of the overlay circuit.

In another aspect, the processor, in executing the framework, is self-hosting.

In another aspect, the processor is configured to execute the framework to provide a browser-enabled interface to a data processing system.

In another aspect, the integrated circuit is included in a productivity platform. The method can include providing a RAM coupled to the integrated circuit and configured as program execution memory for the processor, providing a bulk storage memory coupled to the processor and configured to store an operating system and the framework, and providing an I/O interface coupled to the integrated circuit.

In another aspect, the framework includes a server-based IDE executable by the processor for developing an application in the HPL.

In another aspect, the processor is configured to perform post-bitstream configuration of the overlay circuit once implemented within the programmable circuitry.

In another aspect, the overlay includes at least one runtime customizable element.

In another aspect, the processor is configured to execute an overlay application.

One or more embodiments are directed to an IC. In one aspect, an IC can include programmable circuitry configured to implement an overlay circuit specified by an overlay, wherein the overlay circuit includes a trace buffer configured to receive a probed signal from circuitry within the overlay circuit. The trace buffer can be configured to generate trace data from the probed signal and store the trace data in a runtime allocated memory. The IC can include a processor coupled to the programmable circuitry and configured to control operation of the trace buffer, wherein the processor is configured to read the trace data from the runtime allocated memory.

In an aspect, the trace buffer includes a DMA circuit configured to write the trace data to the runtime allocated memory.

In another aspect, the trace buffer includes a FIFO memory coupled to the DMA circuit, wherein the FIFO memory is configured to store the trace data, wherein the DMA circuit reads the trace data from the FIFO for writing to the runtime allocated memory.

In another aspect, the trace buffer includes a trigger circuit configured to store data within the FIFO memory.

In another aspect, the trace buffer includes a switch coupled to a plurality of signals, wherein the switch is controllable by the processor to pass a selected signal of the plurality of signals as the probed signal.

In another aspect, the processor is configured to execute a software library for a HPL for controlling capture of trace data from the circuitry within the overlay circuit and for analyzing the trace data from the runtime allocated memory.

In another aspect, the processor, executing the software library, is configured to arm the trace buffer.

In another aspect, the processor, executing the software library, is configured to control the trace buffer.

In another aspect, the processor is configured to provide trace data to a data processing system via a browser-enabled interface.

In another aspect, the processor is configured to generate a visualization of the trace data that is provided to a data processing system via a browser-enabled interface.

In another aspect, the processor is configured to modify an application implemented within the programmable circuitry in response to detecting a condition in the trace data.

One or more embodiments are directed to a method. In an aspect, a method can include providing a programmable circuitry configured to implement an overlay circuit specified by an overlay, wherein the overlay circuit includes a trace buffer configured to receive a probed signal from circuitry within the overlay circuit. The trace buffer can be configured to generate trace data from the probed signal and store the trace data in a runtime allocated memory. The method can also include providing a processor coupled to the programmable circuitry and configured to control operation of the trace buffer, wherein the processor is configured to read the trace data from the runtime allocated memory.

In an aspect, the method can include providing a DMA circuit within the trace buffer configured to write the trace data to the runtime allocated memory.

In another aspect, the method can include providing a FIFO memory within the trace buffer, wherein the FIFO memory is coupled to the DMA circuit, wherein the FIFO memory is configured to store the trace data, and wherein the DMA circuit reads the trace data from the FIFO for writing to the runtime allocated memory.

In another aspect, the method can include providing a trigger circuit within the trace buffer configured to store data within the FIFO memory.

In another aspect, the method can include providing a switch within the trace buffer coupled to a plurality of signals, wherein the switch is controllable by the processor to pass a selected signal of the plurality of signals as the probed signal.

In another aspect, the processor is configured to execute a software library for a HPL for controlling capture of trace data from the circuitry within the overlay circuit and for analyzing the trace data from the runtime allocated memory.

In another aspect, the processor, executing the software library, is configured to arm the trace buffer.

In another aspect, the processor, executing the software library, is configured to control the trace buffer.

In another aspect, the processor is configured to provide trace data to a data processing system via a browser-enabled interface.

In another aspect, the processor is configured to generate a visualization of the trace data that is provided to a data processing system via a browser-enabled interface.

In another aspect, the processor is configured to modify an application implemented within the programmable circuitry in response to detecting a condition in the trace data.

One or more embodiments are directed to an IC. In one aspect, an IC can include a slave processor configured to execute instructions, wherein the slave processor is implemented in programmable circuitry of the IC. The IC can include a processor coupled to the slave processor, wherein the processor is hardwired and configured to control operation of the slave processor.

In an aspect, the processor controls operation of the slave processor by executing a library implemented in a productivity-level language.

In another aspect, the processor is configured to provide the slave processor with the instructions at runtime.

In another aspect, the slave processor includes a soft-processor configured to execute the instructions.

In another aspect, the slave processor can include an instruction memory configured to receive the instructions from the processor, wherein the soft-processor retrieves the instructions from the instruction memory for execution.

In another aspect, the processor is configured to hold the slave processor in reset while loading different instructions into the instruction memory and release the soft-processor from reset in response to loading the different instructions into the instruction memory.

In another aspect, the slave processor can include a data memory configured to receive data from the processor, wherein the soft-processor is configured to retrieve the data from the data memory and write result data back to the data memory for retrieval by the processor.

In another aspect, the data memory includes a region of memory reserved for receiving a command from the processor during operation, wherein the region of memory is read-only for the soft-processor, and wherein the soft-processor executes the command during runtime.

the processor is configured to hold the soft-processor in reset while loading new data into the data memory and release the soft-processor from reset in response to loading the new data into the data memory.

In another aspect, wherein the slave processor can include a plurality of circuit blocks each configured to perform a different function. Each of the plurality of circuit blocks is coupled to the soft-processor. The slave processor can also include a switch coupled to each of the plurality of circuit blocks. The switch can be controlled by the soft-processor to selectively couple at least one of the plurality of circuit blocks to signals of the integrated circuit.

In another aspect, the soft-processor is configured to generate an interrupt to the processor in response to detecting a predetermined condition in additional circuitry implemented in the programmable circuitry of the integrated circuit.

One or more embodiments are directed to a method. In an aspect, a method can include providing a slave processor configured to execute instructions, wherein the slave processor is implemented in programmable circuitry of an IC. The method can also include providing, within the IC, a processor coupled to the slave processor, wherein the processor is hardwired and configured to control operation of the slave processor.

In an aspect, the processor controls operation of the slave processor by executing a library implemented in a productivity-level language.

In another aspect, the processor is configured to provide the slave processor with the instructions at runtime.

In another aspect, the method can include providing a soft-processor within the slave processor configured to execute the instructions.

In another aspect, the method can include providing an instruction memory within the slave processor. The instruction memory can be configured to receive the instructions from the processor, wherein the soft-processor retrieves the instructions from the instruction memory for execution.

In another aspect, the processor is configured to hold the slave processor in reset while loading different instructions into the instruction memory and release the soft-processor from reset in response to loading the different instructions into the instruction memory.

In another aspect, the method can include providing a data memory. The data memory can be configured to receive data from the processor. The soft-processor can be configured to retrieve the data from the data memory and write result data back to the data memory for retrieval by the processor.

In another aspect, the data memory includes a region of memory reserved for receiving a command from the processor during operation, wherein the region of memory is read-only for the soft-processor, and wherein the soft-processor executes the command during runtime.

In another aspect, the method can include providing a plurality of circuit blocks within the slave processor, wherein each circuit block can be configured to perform a different function. Each of the plurality of circuit blocks can be coupled to the soft-processor. The method can include providing a switch within the slave processor. The switch can be coupled to each of the plurality of circuit blocks. The switch can be controlled by the soft-processor to selectively couple at least one of the plurality of circuit blocks to signals of the integrated circuit.

In another aspect, the soft-processor is configured to generate an interrupt to the processor in response to detecting a predetermined condition in additional circuitry implemented in the programmable circuitry of the integrated circuit.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. An integrated circuit, comprising:
    programmable circuitry configured to implement an overlay circuit specified by an overlay, wherein the overlay circuit includes a trace buffer configured to receive a probed signal from circuitry within the overlay circuit;
    wherein the trace buffer is configured to generate trace data from the probed signal and store the trace data in a runtime allocated memory;
    a processor coupled to the programmable circuitry and configured to control operation of the trace buffer, wherein the processor is configured to read the trace data from the runtime allocated memory; and
    wherein the processor is configured to execute a software library for a high-productivity language for controlling capture of trace data from the circuitry within the overlay circuit and for analyzing the trace data from the runtime allocated memory.

2. The integrated circuit of claim 1, wherein the trace buffer comprises:
    a direct memory access circuit configured to write the trace data to the runtime allocated memory.

3. The integrated circuit of claim 2, wherein the trace buffer comprises:
    a first-in-first-out memory coupled to the direct memory access circuit, wherein the first-in-first out memory is configured to store the trace data, wherein the direct memory access circuit reads the trace data from the first-in-first-out memory for writing to the runtime allocated memory.

4. The integrated circuit of claim 3, wherein the trace buffer comprises:
a trigger circuit configured to store data within the first-in-first-out memory.

5. The integrated circuit of claim 1, wherein the trace buffer further comprises:
a switch coupled to a plurality of signals, wherein the switch is controllable by the processor to pass a selected signal of the plurality of signals as the probed signal.

6. The integrated circuit of claim 1, wherein the processor, executing the software library, is configured to arm the trace buffer.

7. The integrated circuit of claim 1, wherein the processor, executing the software library, is configured to control the trace buffer.

8. The integrated circuit of claim 1, wherein the processor is configured to provide trace data to a data processing system via a browser-enabled interface.

9. The integrated circuit of claim 1, wherein the processor is configured to generate a visualization of the trace data that is provided to a data processing system via a browser-enabled interface.

10. The integrated circuit of claim 1, wherein the processor is configured to modify an application implemented within the programmable circuitry in response to detecting a condition in the trace data.

11. A method, comprising:
providing, within an integrated circuit, a programmable circuitry configured to implement an overlay circuit specified by an overlay, wherein the overlay circuit includes a trace buffer configured to receive a probed signal from circuitry within the overlay circuit;
wherein the trace buffer is configured to generate trace data from the probed signal and store the trace data in a runtime allocated memory;
providing, within the integrated circuit, a processor coupled to the programmable circuitry and configured to control operation of the trace buffer, wherein the processor is configured to read the trace data from the runtime allocated memory; and
wherein the processor is configured to execute a software library for a high-productivity language for controlling capture of trace data from the circuitry within the overlay circuit and for analyzing the trace data from the runtime allocated memory.

12. The method of claim 11, further comprising:
providing a direct memory access circuit within the trace buffer configured to write the trace data to the runtime allocated memory.

13. The method of claim 12, further comprising:
providing a first-in-first-out memory within the trace buffer, wherein the first-in-first out memory is coupled to the direct memory access circuit and is configured to store the trace data, wherein the direct memory access circuit reads the trace data from the first-in-first-out memory for writing to the runtime allocated memory.

14. The method of claim 13, further comprising:
providing a trigger circuit within the trace buffer, wherein the trigger circuit is configured to store data within the first-in-first-out memory.

15. The method of claim 11, further comprising:
providing a switch coupled to a plurality of signals, wherein the switch is controllable by the processor to pass a selected signal of the plurality of signals as the probed signal.

16. The method of claim 11, wherein the processor, executing the software library, is configured to arm the trace buffer.

17. The method of claim 11, wherein the processor, executing the software library, is configured to control the trace buffer.

18. The method of claim 11, wherein the processor is configured to generate a visualization of the trace data that is provided to a data processing system via a browser-enabled interface.

19. An integrated circuit, comprising:
programmable circuitry configured to implement an overlay circuit specified by an overlay, wherein the overlay circuit includes a trace buffer configured to receive a probed signal from circuitry within the overlay circuit;
wherein the trace buffer is configured to generate trace data from the probed signal and store the trace data in a runtime allocated memory;
a processor coupled to the programmable circuitry and configured to control operation of the trace buffer, wherein the processor is configured to read the trace data from the runtime allocated memory; and
wherein the trace buffer comprises a direct memory access circuit configured to write the trace data to the runtime allocated memory.

20. The integrated circuit of claim 19, wherein the processor is configured to execute a software library for a high-productivity language for controlling capture of trace data from the circuitry within the overlay circuit and for analyzing the trace data from the runtime allocated memory.

* * * * *